US008364799B2

(12) United States Patent
Sakai

(10) Patent No.: US 8,364,799 B2
(45) Date of Patent: Jan. 29, 2013

(54) MANAGEMENT SERVER AND CONTENT MOVING SYSTEM

(75) Inventor: Hiroki Sakai, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1264 days.

(21) Appl. No.: 11/940,447

(22) Filed: Nov. 15, 2007

(65) Prior Publication Data

US 2008/0120404 A1 May 22, 2008

(30) Foreign Application Priority Data

Nov. 20, 2006 (JP) ................................. 2006-312655

(51) Int. Cl.
*G06F 15/173* (2006.01)
(52) U.S. Cl. .................... 709/223; 709/224; 709/226
(58) Field of Classification Search .................. 709/223
See application file for complete search history.

(56) References Cited

U.S. PATENT DOCUMENTS

| | | | |
|---|---|---|---|
| 5,740,028 A * | 4/1998 | Sugiyama et al. ............ 725/149 |
| 5,805,804 A * | 9/1998 | Laursen et al. ................ 709/223 |
| 5,991,804 A * | 11/1999 | Bolosky et al. ............... 709/221 |
| 6,112,239 A * | 8/2000 | Kenner et al. ................. 709/224 |
| 6,138,156 A * | 10/2000 | Fletcher et al. ................ 709/224 |
| 6,654,830 B1 * | 11/2003 | Taylor et al. .................... 710/74 |
| 6,928,471 B2 * | 8/2005 | Pabari et al. ................... 709/223 |
| 7,739,465 B2 * | 6/2010 | Kameyama et al. ........... 711/162 |
| 2002/0062372 A1 * | 5/2002 | Hong et al. .................... 709/225 |
| 2004/0025186 A1 * | 2/2004 | Jennings et al. ................. 725/93 |
| 2004/0047354 A1 * | 3/2004 | Slater et al. .................... 370/400 |
| 2005/0114728 A1 * | 5/2005 | Aizawa et al. ..................... 714/6 |
| 2006/0230143 A1 * | 10/2006 | Ziegler et al. ................. 709/224 |
| 2007/0079170 A1 * | 4/2007 | Zimmer et al. .................... 714/6 |
| 2008/0005223 A1 * | 1/2008 | Flake et al. .................... 709/203 |

FOREIGN PATENT DOCUMENTS

| | | |
|---|---|---|
| JP | 2000-089984 A | 3/2000 |
| JP | 2004-355188 A | 12/2004 |
| JP | 2006-18963 A | 1/2006 |
| JP | 2006-24066 A | 1/2006 |
| JP | 2006-79219 A | 3/2006 |

OTHER PUBLICATIONS

Japanese Office Action dated Dec. 13, 2011 with English translation (six (6) pages).

* cited by examiner

*Primary Examiner* — Firmin Backer
*Assistant Examiner* — Keyvan Emdadi
(74) *Attorney, Agent, or Firm* — Crowell & Moring LLP

(57) ABSTRACT

A management server to manage a plurality of media servers each to store contents, the server comprising: a failure rate calculating section to calculate a failure rate of each of the plurality of media servers; a judgment section to judge whether or not there is a media server having the failure rate which has been calculated by the failure rate calculating section and which exceeds a predetermined threshold value, among the plurality of media servers; and a movement controlling section to move the contents being stored in the media server judged to have the failure rate exceeding the predetermined threshold value by the judgment section to a media server judged to have failure rate less than the predetermined threshold value by the judgment section.

2 Claims, 15 Drawing Sheets

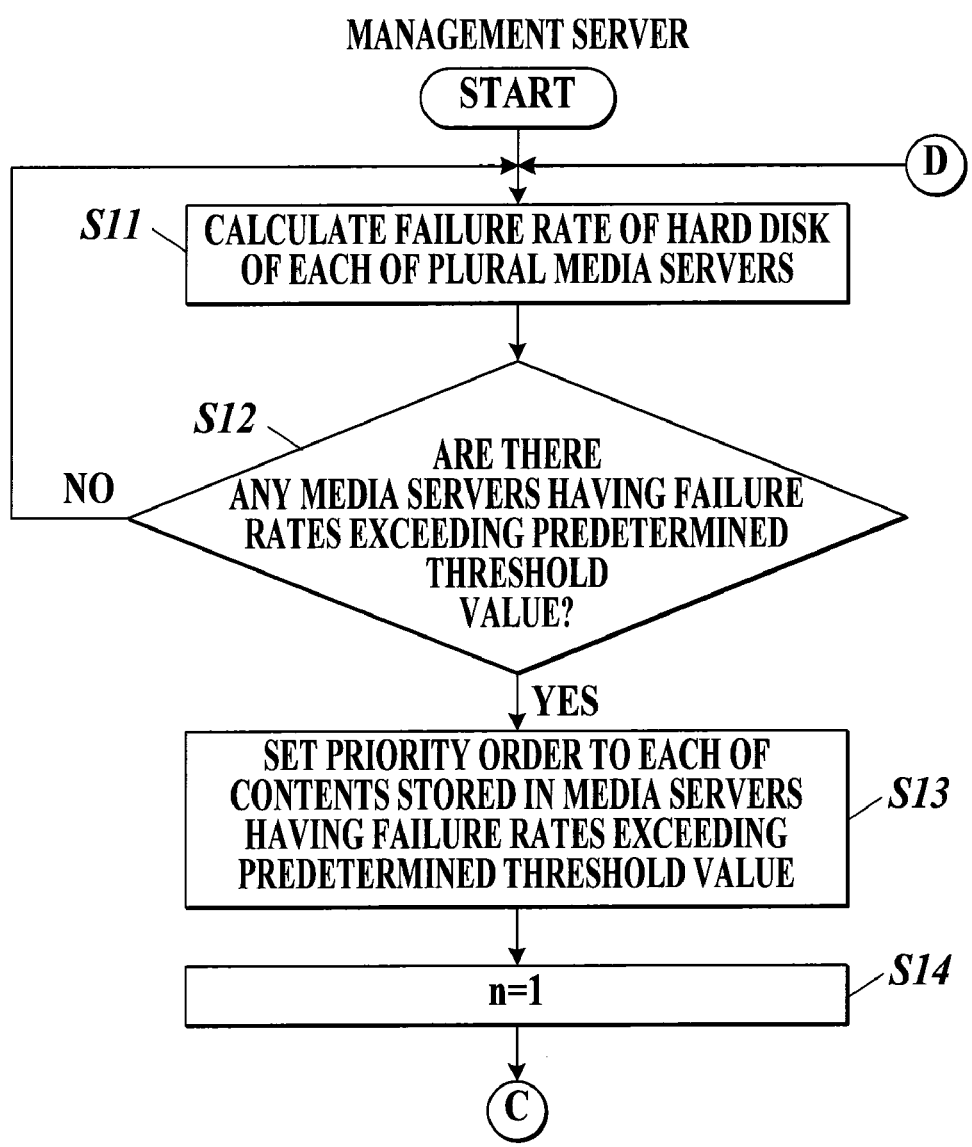

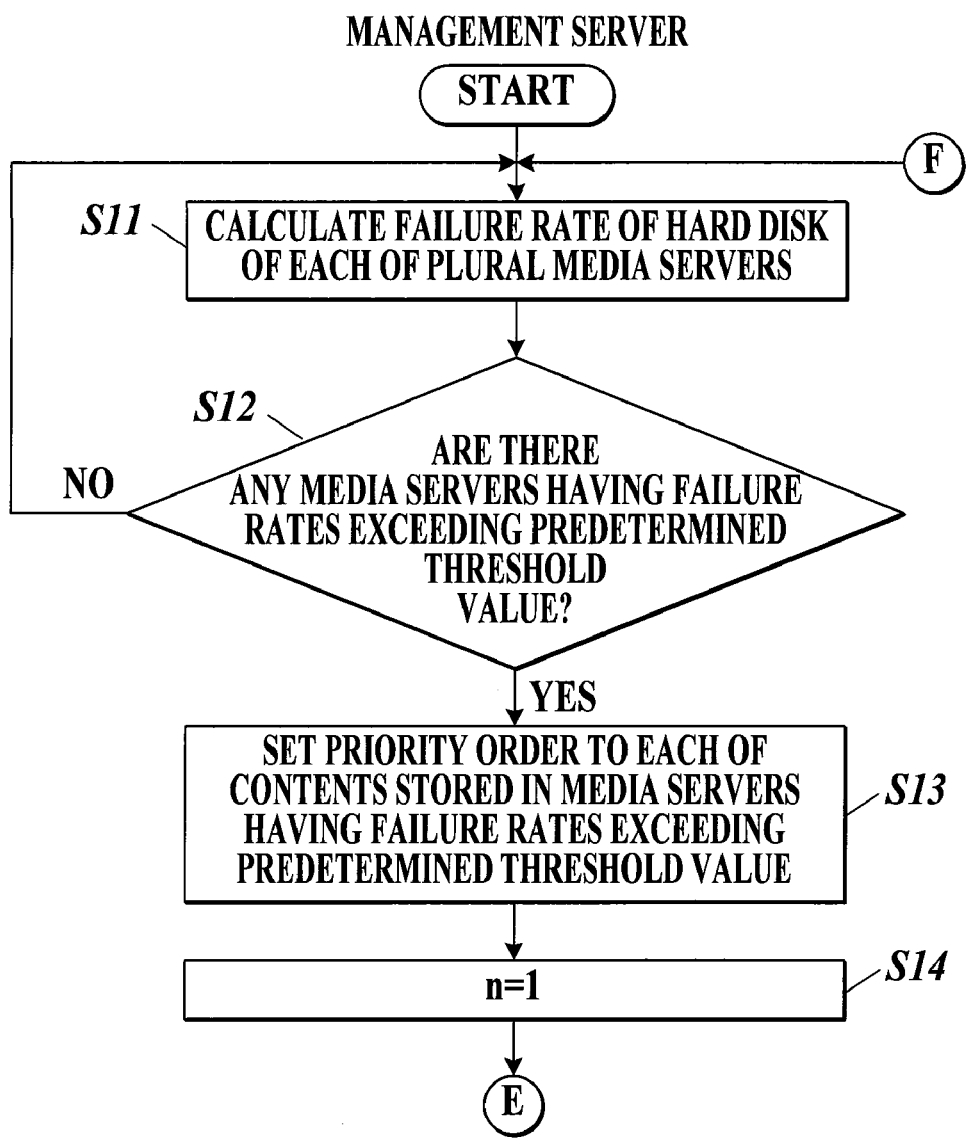

MANAGEMENT SERVER AND CONTENT MOVING SYSTEM

BACKGROUND OF THE INVENTION

1. Field of the Invention

The present invention relates to a management server and a content moving system.

2. Description of Related Art

Conventionally, a media server, such as a personal computer, a home server, and a digital versatile disk (DVD)/hard disk drive (HDD) recorder, which server is mounted with a hard disk (storage device) for storing content, such as a broadcast program, is known.

Because the hard disk mounted in the media server is a device using parts to vary across the ages to be, for example, worn away, the failure rate of the hard disk rises according to age of use. Consequently, for example, if recorded content remains in a hard disk having a high failure rate, there is a problem of the loss of the content in some time.

Accordingly, various techniques were proposed in order to solve this problem.

To put it concretely, for example, the following control device was proposed (see, for example, Japanese Patent Application Laid-Open Publication No. 2006-79219). The control device controls a disk array composed of a plurality of storage devices to store content and spare storage devices. When the control device stores content from the outside, the control device calculates the failure risk rate of each of the storage devices. Then, the control device sets the storage devices having lower failure risk rates as the plurality of storage devices and sets the storage devices having higher failure risk rates as the spare storage devices.

Moreover, for example, the following client server system was proposed (see, for example, Japanese Patent Application Laid-Open Publication No. 2006-24066). The client server system includes a plurality of clients and a management server to manage the plurality of clients. In the client server system, the management server predicts the failures of the hard disks on the client sides, and then the client server system produces the backups of the hard disks on the client sides on the removable hard disk on the management server side which removable hard disk is compatible with the hard disks on the client sides on the basis of the prediction results.

Moreover, for example, the following hard disk storage device was proposed (see, for example, Japanese Patent Application Laid-Open Publication No. 2006-18963). The hard disk storage device records a broadcast program the recording reservation of which has previously be made. The hard disk storage device has a self-diagnosis function to detect the existence of the abnormality of the hard disk thereof. When the hard disk storage device detects an abnormality, the hard disk storage device displays the self-diagnosis result on the display section thereof.

Moreover, for example, the following information processing device was proposed (see, for example, Japanese Patent Application Laid-Open Publication No. 2004-355188). The information processing device is equipped with a plurality of hard disks, and determines a hard disk to be principally used as a principally used hard disk during a changing period set in advance at the time of activation. The information processing device checks whether the previously set changing period has elapsed or not during the time of the normal operation thereof, and uses the principally used hard disk by changing the principally used hard disk every changing period in an order determined in advance.

However, because the technique disclosed in the Japanese Patent Application Laid-Open Publication No. 2006-79219 calculates the failure risk rates of the storage devices at the times of storing content, the technique cannot prevent the loss of the content owing to a failure of a storage device which failure is brought about after the passage of years.

Moreover, because the technique disclosed in the Japanese Patent Application Laid-Open Publication No. 2006-24066 stores the backup (copy) on the server side and stores the originals on the client sides, the technique has the problem of the useless consumption of the storage regions thereof.

Moreover, when the technique disclosed in the Japanese Patent Application Laid-Open Publication No. 2006-18963 detects an abnormality, all the things that the technique performs are only the information of the abnormality to a user. Consequently, if the user does not recognize the information, the loss of the content owing to a failure of the storage device cannot be prevented.

Moreover, because all the things that the technique disclosed in the Japanese Patent Application Laid-Open Publication No. 2004-355188 performs are only to change the principally used hard disk every predetermined switching period to execute reading processing and writing processing to the hard disk, the loss of content owing to a failure of the storage device which failure is brought about after the passage of years cannot be prevented.

SUMMARY OF THE INVENTION

It is, therefore, a main object of the present invention to provide a management server, which is suitably capable of reducing the risk of losing the content stored in the hard disk mounted in a certain media server owing to the failure of the hard disk, and to provide a content moving system including the management server.

According to a first aspect of the present invention, there is provided a content moving system, comprising a plurality of media servers each to store contents, and a management server to manage the plurality of media servers, wherein the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize the contents stored in the media server calculated to have the failure rate exceeding the predetermined threshold value; a residual quantity calculating section to calculate a residual quantity of a storage capacity of each of the plurality of media servers; and a movement controlling section to move, according to priorities set by the setting section, the contents one by one, the contents being stored in the media server judged to have the failure rate exceeding the predetermined threshold value by the judgment section, to a media server calculated by the failure rate calculating section to have a lowest failure rate among media servers which are calculated by the residual quantity calculating section to have residual quantities of storage capacities larger than an information quantity of a content which is to be moved next, and which are judged to have failure rates less than the predetermined threshold value by the judgment section, and the plurality of media servers respectively include storage sections to store the contents.

According to a second aspect of the present invention, there is provided a content moving system, comprising a plurality of media servers each to store contents, and a management server to manage the plurality of media servers, wherein the plurality of media servers respectively include storage sections to store the contents, and the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize the contents stored in the media server calculated to have the failure rate exceeding the predetermined threshold value; a residual quantity calculating section to calculate a residual quantity of a storage capacity of each of the plurality of media servers; an image quality lowering control section to lower image qualities of the contents respectively stored in the media servers, and a movement controlling section to move, according to priorities set by the setting section, the contents one by one, the contents being stored in the media server judged to have the failure rate exceeding the predetermined threshold value by the judgment section to a media server calculated by the failure rate calculating section to have a lowest failure rate among media servers which are calculated by the residual quantity calculating section to have residual quantities of storage capacities larger than an information quantity of a content which is to be moved next, and which are judged to have failure rates less than the predetermined threshold value by the judgment section, and when the content to be moved next cannot be moved to any of the media servers judged to have failure rates less than the predetermined threshold value by the judgment section, because an information quantity of the content to be moved next is larger than the residual quantities of the media servers judged to have failure rates less than the predetermined threshold value by the judgment section, the movement controlling section being to move copy data of the content to be moved next, the image quality of the copy data being lowered by the image quality lowering control section, to the media server calculated by the failure rate calculating section to have a lowest failure rate among media servers which are judged to have failure rates less than the predetermined threshold value by the judgment section, and to leave original data of the content to be moved next in the media server which has stored the content.

According to a third aspect of the present invention, there is provided a management server to manage a plurality of media servers each to store contents, the management server comprising: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; and a movement controlling section to move the contents stored in the media server judged to have the failure rate exceeding the predetermined threshold value by the judgment section to a media server judged to have a failure rate less than the predetermined threshold value by the judgment section.

Preferably, the management server further includes: a setting section to prioritize the contents stored in the media server calculated to have the failure rate exceeding the predetermined threshold value; and a residual quantity calculating section to calculate a residual quantity of a storage capacity of each of the plurality of media servers, wherein the movement controlling section moves, according to priorities set by the setting section, the contents one by one, the contents being stored in the media server judged to have the failure rate exceeding the predetermined threshold value by the judgment section, to a media server calculated by the failure rate calculating section to have a lowest failure rate among media servers which are calculated by the residual quantity calculating section to have residual quantities of storage capacities larger than an information quantity of a content which is to be moved next.

Preferably, the management server further includes: an image quality lowering control section to lower image qualities of the contents respectively stored in the media servers, wherein when the content to be moved next cannot be moved to any of the media servers judged to have failure rates less than the predetermined threshold value by the judgment section, because the information quantity of the content to be moved next is larger than the residual quantities of the media servers judged to have failure rates less than the predetermined threshold value by the judgment section, the movement controlling section is to move the content to be moved next, the image quality of the content being lowered by the image quality lowering control section, to the media server calculated by the failure rate calculating section to have a lowest failure rate among media servers which are judged to have failure rates less than the predetermined threshold value by the judgment section.

Preferably, the movement controlling section of the management server moves copy data of the content to be moved next, the image quality of the copy data being lowered by the image quality lowering control section, to the media server calculated by the failure rate calculating section to have the lowest failure rate among media servers which are judged to have failure rates less than the predetermined threshold value by the judgment section, and leaves original data of the content to be moved next in the media server which has stored the content.

According to a fourth aspect of the present invention, there is provided a content moving system, comprising a plurality of media servers each to store contents, and a management server to manage the plurality of media servers, wherein the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize all of the contents stored in media servers calculated to have the failure rate exceeding the predetermined threshold value; and a movement controlling section to move, according to priorities set by the setting section, the contents one by one, the contents being stored in the media servers judged to have the failure rate exceeding the predetermined threshold value by the judgment section, to a media server calculated by a failure rate calculating section to have a lowest failure rate, and the plurality of media servers respectively include storage sections to store the contents.

According to a fifth aspect of the present invention, there is provided a management server to manage a plurality of media servers each to store contents, the server comprising: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize all of the contents stored in media servers calculated to have the failure rate exceeding the predetermined threshold value; and a movement controlling section to move, according to priorities set by the setting section, the contents one by one, the contents being stored in the media servers judged to have the failure rate exceeding the predetermined threshold value by the judgment section, to a media server calculated by a failure rate calculating section to have a lowest failure rate.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

In the following, the best modes including a management server and the content moving system of the management server according to the present invention are described in detail with reference to the attached drawings. Incidentally, the scope of the invention is not limited to the shown examples.

First Embodiment

A management server 6 and a content moving system 1 including the management server 6 of a first embodiment are first described.
<Configuration of Content Moving System>

The configuration of the content moving system 1 is first described with reference to FIGS. 1-4.

Figure 1:
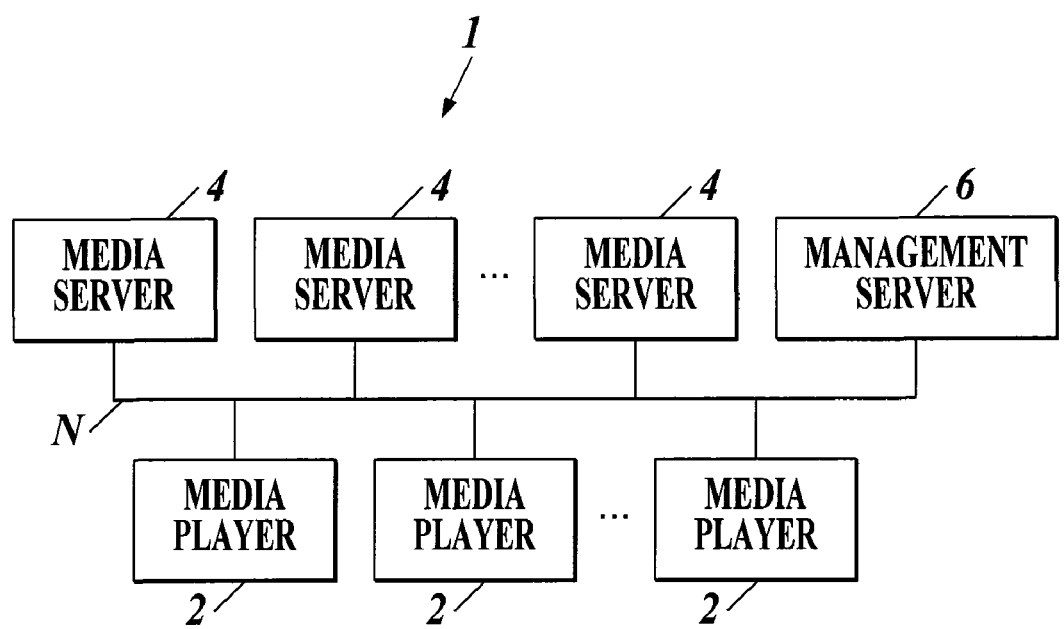
FIG. 1 is a diagram showing the configuration of the content moving system of a first embodiment.

The content moving system 1 includes, for example, as shown in FIG. 1, a plurality of media players 2 to receive content or to reproduce the received content, a plurality of media servers 4 to store the content received by the media players 2, and the management server 6 to manage the plurality of media servers 4.

The plurality of media players 2, the plurality of media servers 4, and the management server 6 are connected to one another through, for example, a network N.

Incidentally, the management server 6 may be configured to be incorporated in one of the plurality of media players 2, or may be configured to be incorporated in one of the plurality of media servers 4.
<Configurations of Media Players>

Figure 2:
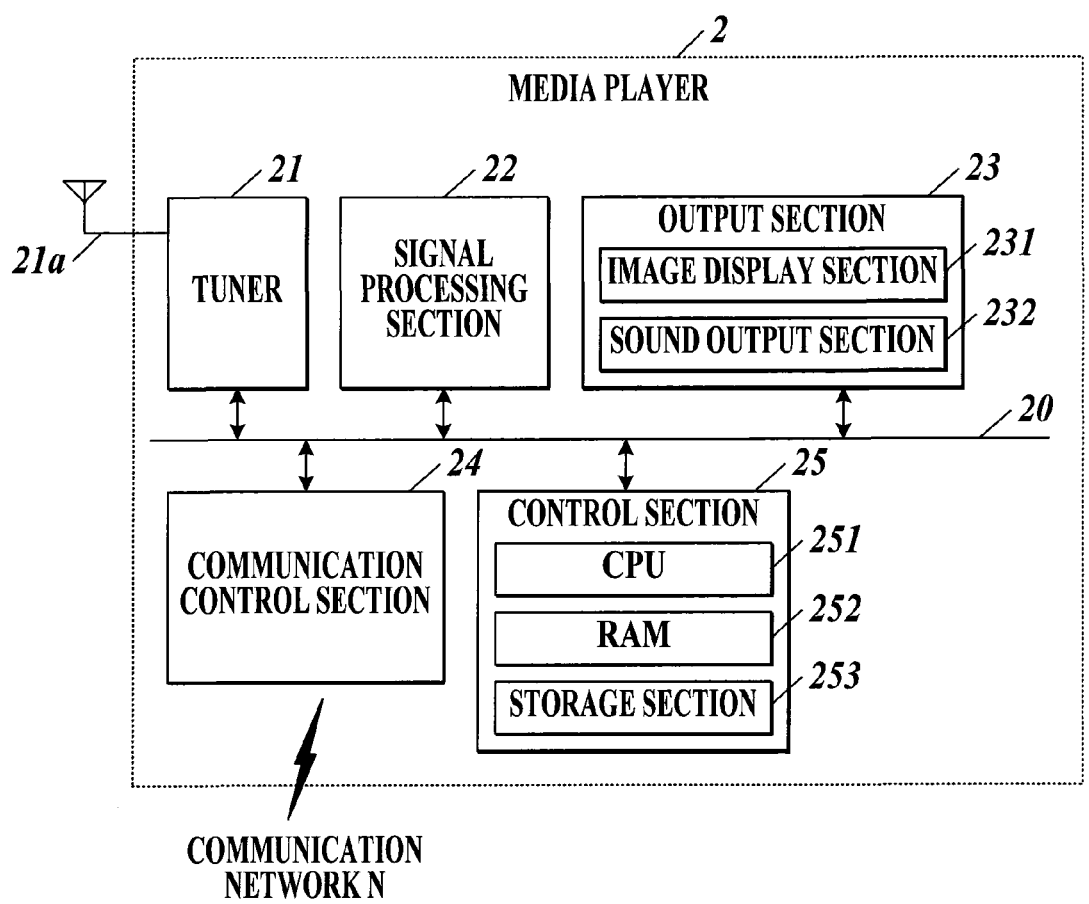
FIG. 2 is a block diagram showing the functional configuration of a media player of FIG. 1.

Each of the media players 2 is, for example, a television receiver to receive content or to reproduce the received content, and the like. Each of the media players 2 includes, for example, as shown in FIG. 2, a tuner 21 equipped with an antenna 21a, a signal processing section 22, an output section 23, a communication control section 24, a control section 25, and the like. Each section is connected to one another through a bus 20.

The tuner 21 receives, for example, the content of the broadcast program that a user desires from a television broadcast wave in conformity with a control signal input from the control section 25.

To put it concretely, the tuner 21 receives, for example, the content (television broadcast signal) existing in the frequency band corresponding to the channel of the broadcast program desired by the user from the television broadcast wave received with the antenna 21a, and modulates the received content to output the modulated content to the signal processing section 22.

The signal processing section 22 performs predetermined processing to the content input from, for example, the tuner 21 in conformity with a control signal input from the control section 25 to separate image data and sound data from the content. The signal processing section 22 decodes the image data to output the decoded image data to an image display section 231 (which will be described later) of the output section 23, and decodes the sound data to output the decoded sound data to a sound output section 232 (which will be described later) of the output section 23.

Moreover, the signal processing section 22 performs predetermined processing to, for example, the content input from the tuner 21 in conformity with a control signal input from the control section 25, and outputs the processed content to the communication control section 24. The content output to the communication control section 24 is transmitted to the media servers 4 through the network N, and is stored in hard disks 43 (which will be described later) of the media servers 4.

Then, when the content stored in the hard disks 43 of the media servers 4 is received by the communication control section 24 of each of the media players 2 through the network N, the signal processing section 22 performs, for example, predetermined processing to the content in conformity with a control signal input from the control section 25 to separate image data, sound data, and the like from the content. The signal processing section 22 decodes the image data to output the decoded image data to the image display section 231 (which will be described later) of the output section 23, and decodes the sound data to output to the sound output section 232 (which will be described later) of the output section 23.

The output section 23 includes, for example, as shown in FIG. 2, the image display section 231, the sound output section 232, and the like.

The image display section 231 is, for example, a liquid crystal display device or the like, and displays an image based on the image data input from the signal processing section 22.

The sound output section 232 is, for example, a speaker device or the like, and outputs a sound based on the sound data input from the signal processing section 22.

The communication control section 24 performs the transmission and the reception of various kinds of data with external devices through, for example, the network N.

The control section 25 includes, for example, as shown in FIG. 2, a central processing unit (CPU) 251, a random access memory (RAM) 252, a storage section 253, and the like.

The CPU 251 performs, for example, various control operations in conformity with various processing programs for the media players 2 stored in the storage section 253.

The RAM 252 includes, for example, a program storing region for expanding the processing programs and the like that are executed by the CPU 251, a data storing region for storing input data and processing results produced at the times of the execution of the processing programs, and the like.

The storage section 253 stores, for example, a system program that can be executed in the media player 2, various processing programs that can be executed on the system program, data to be used at the times of the execution of these various processing programs, the data of the processing results of arithmetic processing by the CPU 251, and the like. Incidentally, the programs are stored in the storage section 253 in the form of the program codes that can be read by a computer.

<Configurations of Media Servers>

Figure 3:
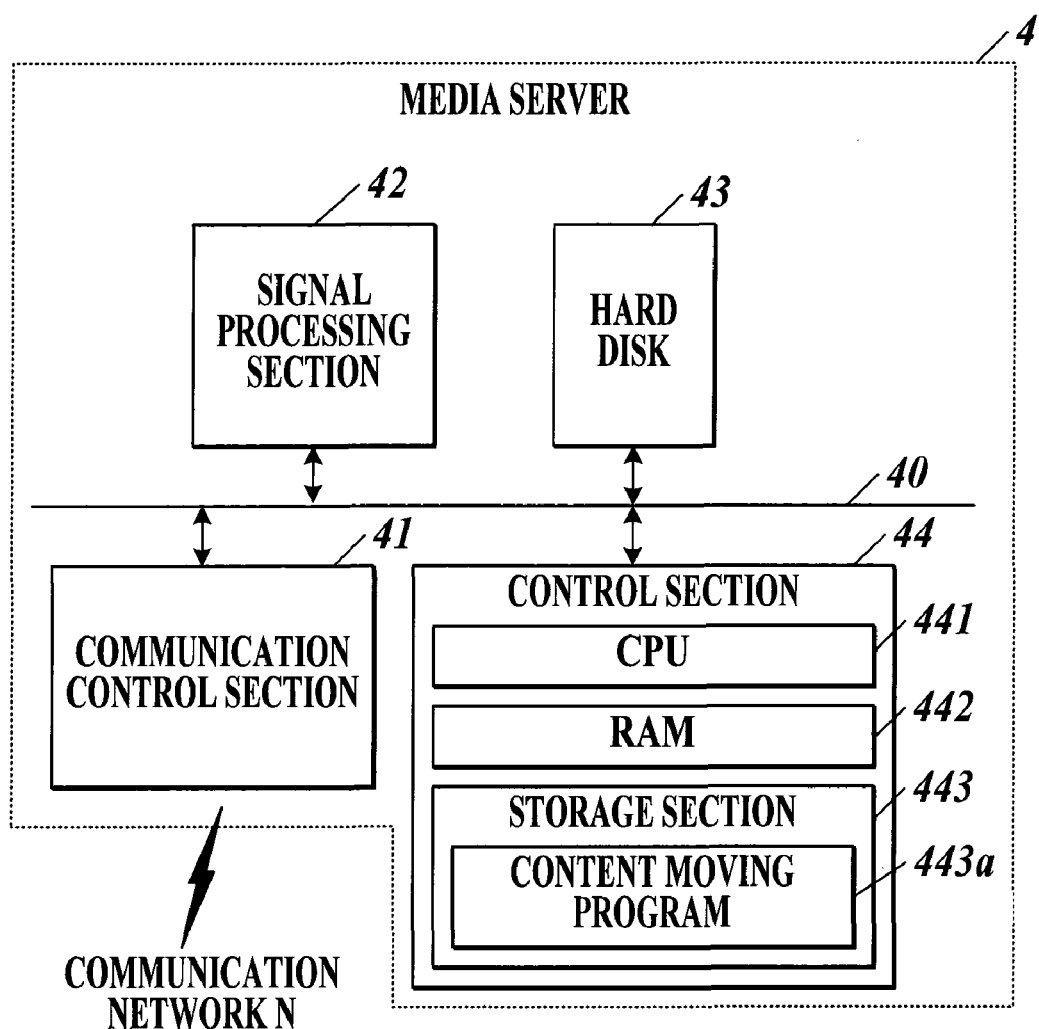
FIG. 3 is a block diagram showing the functional configuration of a media server of FIG. 1.

Each of the media servers 4 is, for example, a HDD recorder to store content, and includes, for example, as shown in FIG. 3, a communication control section 41, a signal processing section 42, a hard disk 43, a control section 44, and the like. Each of the sections is connected to one another through a bus 40.

The communication control section 41 performs the transmission and the reception of various kinds of data with external devices through, for example, the network N.

The signal processing section 42 performs predetermined processing to content that has been transmitted from, for example, one of the media players 2 or another media server 4 and has been received by the communication control section 41 in conformity with a control signal input from the control section 44, and outputs the processed content to the hard disk 43.

Moreover, the signal processing section 42 performs predetermined processing to, for example, the content stored in the hard disk 43 in conformity with a control signal input from the control section 44, and outputs the processed content to the communication control section 41. The content output to the communication control section 41 is transmitted to the media players 2 or the other media servers 4 through the network N.

The hard disk 43 stores, for example, contents input from the signal processing section 42 as a storage section in conformity with a control signal input from the control section 44.

The control section 44 includes, for example, as shown in FIG. 3, a CPU 441, a RAM 442, a storage section 443, and the like.

The CPU 441 performs, for example, various control operations in conformity with various processing programs for the media server 4 stored in the storage section 443.

The RAM 442 includes, for example, a program storing region for expanding the processing programs to be executed by the CPU 441, a data storing region for storing input data and the processing results produced at the times of the execution of the processing programs, and the like.

The storage section 443 stores, for example, a system program to be able to be executed by the media server 4, various processing programs to be able to be executed on the system program, the data to be used at the times of the execution of these various processing programs, the data of the processing results of arithmetic processing of the CPU 441, and the like. Incidentally, the programs are stored in the storage section 443 in the form of the program codes that can be read by a computer.

To put it concretely, the storage section 443 stores, for example, a content moving program 443a.

The content moving program 443a enables the CPU 441 to realize the function of moving the content stored in the hard disk 43 to another media server 4 in conformity with, for example, content moving control information transmitted from the management server 6 and received by the communication control section 41.

The content moving control information here includes, for example, content identifying information to identify the content to be moved, media server identifying information to identify the media server 4 of the move destination of the content, and the like.

<Configuration of Management Server>

Figure 4:
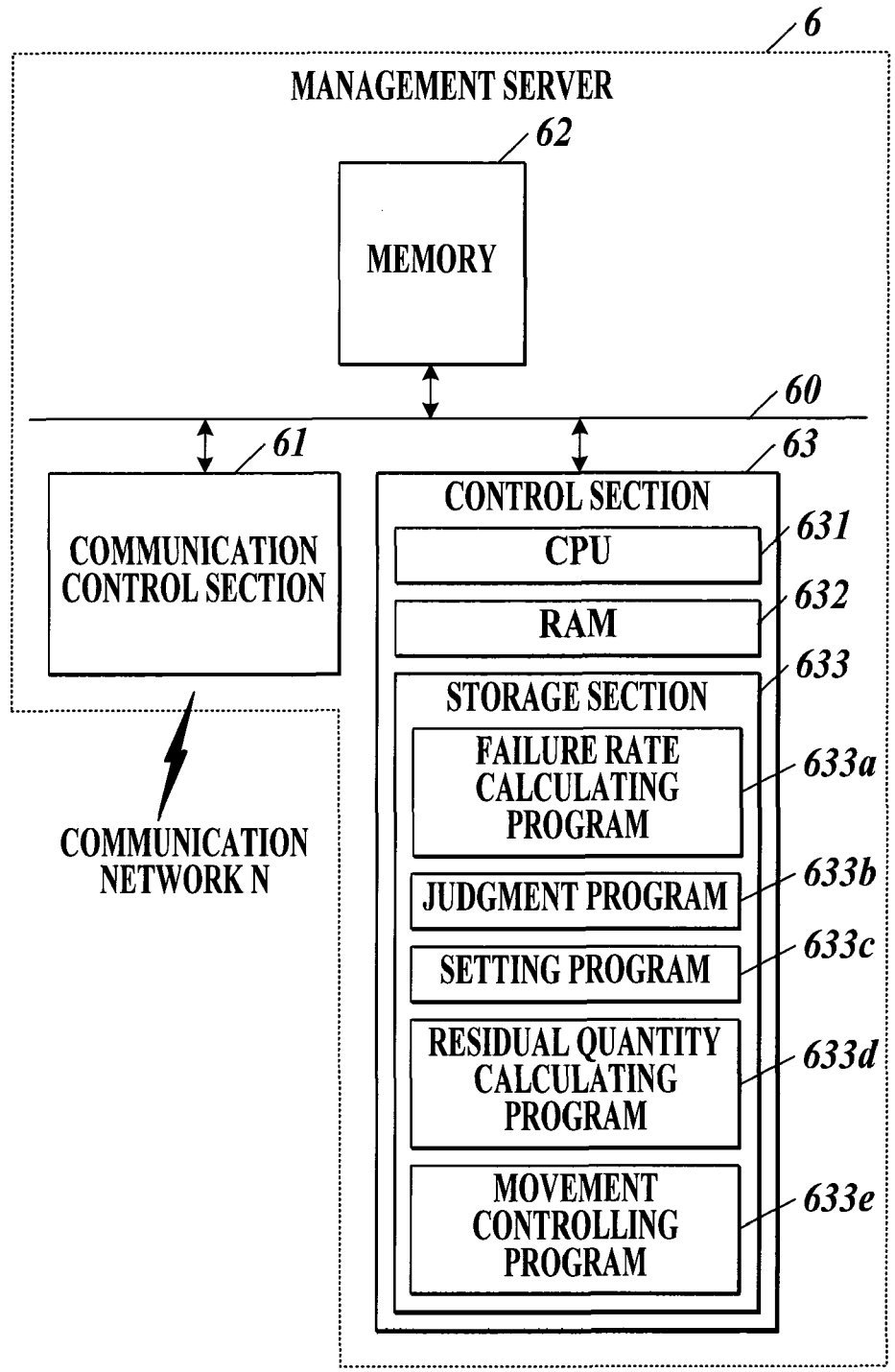
FIG. 4 is a block diagram showing the functional configuration of the management server of FIG. 1.

The management server 6 is a device to manage, for example, the hard disks 43 mounted in the media servers 4, and includes, for example, as shown in FIG. 4, a communication control section 61, a memory 62, a control section 63, and the like. Each of the sections is connected to one another through a bus 60.

The communication control section 61 performs the transmission and the reception of various kinds of data with external devices through, for example, the network N.

The memory 62 stores, for example, the information pertaining to the hard disk 43 mounted in each of the plurality of media servers 4 on the network N, the information pertaining to the content stored in the hard disk 43, and the like.

To put it concretely, the memory 62 stores, for example, the sum of operating times of the hard disk 43, the mean time between failure (MTBF) of the hard disk 43, the storage capacity of the hard disk 43, and the like, as the information pertaining to the hard disk 43.

Moreover, the memory 62 stores, for example, the information quantity, the recorded date, the recording time, the number of viewing, the image quality, the genre, and the like, of content as the information pertaining to the content.

The control section 63 includes, for example, as shown in FIG. 4, a CPU 631, a RAM 632, a storage section 633, and the like.

The CPU 631 performs, for example, various control operations in conformity with various processing programs for the management server 6 stored in the storage section 633.

The RAM 632 includes, for example, a program storing region for expanding the processing programs and the like to be executed by the CPU 631, a data storing region for storing input data and processing results produced at the times of the execution of the processing programs, and the like.

The storage section 633 stores, for example, a system program to be able to be executed by the management server 6, various processing programs to be able to be executed on the system program, the data to be used at the times of the execution of the various processing programs, the data of the processing results of arithmetic processing of the CPU 631, and the like. Incidentally, the programs are stored in the storage section 633 in the form of the program codes that can be read by a computer.

To put it concretely, the storage section 633 stores, for example, a failure rate calculating program 633a, a judgment program 633b, a setting program 633c, a residual quantity calculating program 633d, a movement controlling program 633e, and the like.

The failure rate calculating program 633a enables the CPU 631 to realize, for example, the function of calculating the failure rate of the hard disk 43 mounted in each of the plurality of media servers 4 on the basis of the information stored in the memory 62.

To put it concretely, the CPU 631 calculates the failure rate of the hard disk 43 by, for example, dividing the sum of the operating times of the hard disk 43 by the MTBF of the hard disk 43.

The CPU 631 functions as a failure rate calculating section by executing such failure rate calculating program 633a.

The judgment program 633b enables the CPU 631 to realize, for example, the function of judging whether there are media servers 4 having the failure rates exceeding a predetermined threshold value, which failure rates have been calculated by the CPU 631, which has executed the failure rate calculating program 633a, among the plurality of media servers 4 or not.

The CPU 631 functions as a judgment section by executing such judgment program 633b.

The setting program 633c enables the CPU 631 to realize the function of prioritizing the contents stored in the hard disk 43 mounted in each of the media servers 4 on the basis of, for example, the information stored in the memory 62.

To put it concretely, the CPU 631, for example, sets the priority order in such a way that the newer the recorded date of content is, the higher the priority order given to the content is.

The CPU 631 functions as a setting section by executing such a setting program 633c.

The residual quantity calculating program 633d enables the CPU 631 to realize, for example, the function of calculating the residual quantity of the storage capacity of the hard disk 43 mounted in each of the plurality of media servers 4 on the basis of the information stored in the memory 62.

To put it concretely, the CPU 631 calculates the residual quantity of the storage capacity of the hard disk 43 by, for example, subtracting the sum of the information quantity of the content stored in the hard disk 43 from the storage capacity of the hard disk 43.

The CPU 631 functions as a residual quantity calculating section by executing such residual quantity calculating program 633d.

The movement controlling program 633e enables the CPU 631 to realize, for example, the function to move, according to priorities set by the CPU 631, which has executed the setting program 633c, the contents one by one, the contents being stored in the media server 4 judged to have the failure rate exceeding the predetermined threshold value by the CPU 631, which has executed the judgment program 633b, to a media server 4 calculated by the CPU 631, which has executed the failure rate calculating program 633a, to have a lowest failure rate among media servers 4 which are calculated by the CPU 631, which has executed the residual quantity calculating program 633d, to have residual quantities of storage capacities larger than an information quantity of a content which is to be moved next, and which are judged to have failure rates less than the predetermined threshold value by the CPU 631, which has executed the judgment program 633b.

To put it concretely, the CPU 631 moves the contents in the order of the heights of the priority orders of the content to the media server 4 having the lowest failure rate among those of the other media servers 4 having the residual quantities of their storage capacities more than the information quantity of the content. The CPU 631 then executes the operation until all of the pieces of content stored in the hard disks 43 of the media servers 4 judged to have the failure rates exceeding the predetermined threshold value have been moved, or until the content to be moved cannot be moved to the other media servers 4 because the information quantity of the content is too large to be moved to the other media servers 4.

To put it more concretely, the CPU 631, for example, inputs a control signal into the communication control section 61 to make the communication control section 61 transmit content moving control information including content identifying information to identify the content to be moved and media server identifying information to identify the media servers 4 of the move destinations of the content to the media servers 4 judged to have the failure rates exceeding the predetermined threshold value.

The CPU 631 functions as a movement controlling section by executing such movement controlling program 633e.

<Content Moving Processing>

Figure 5B:
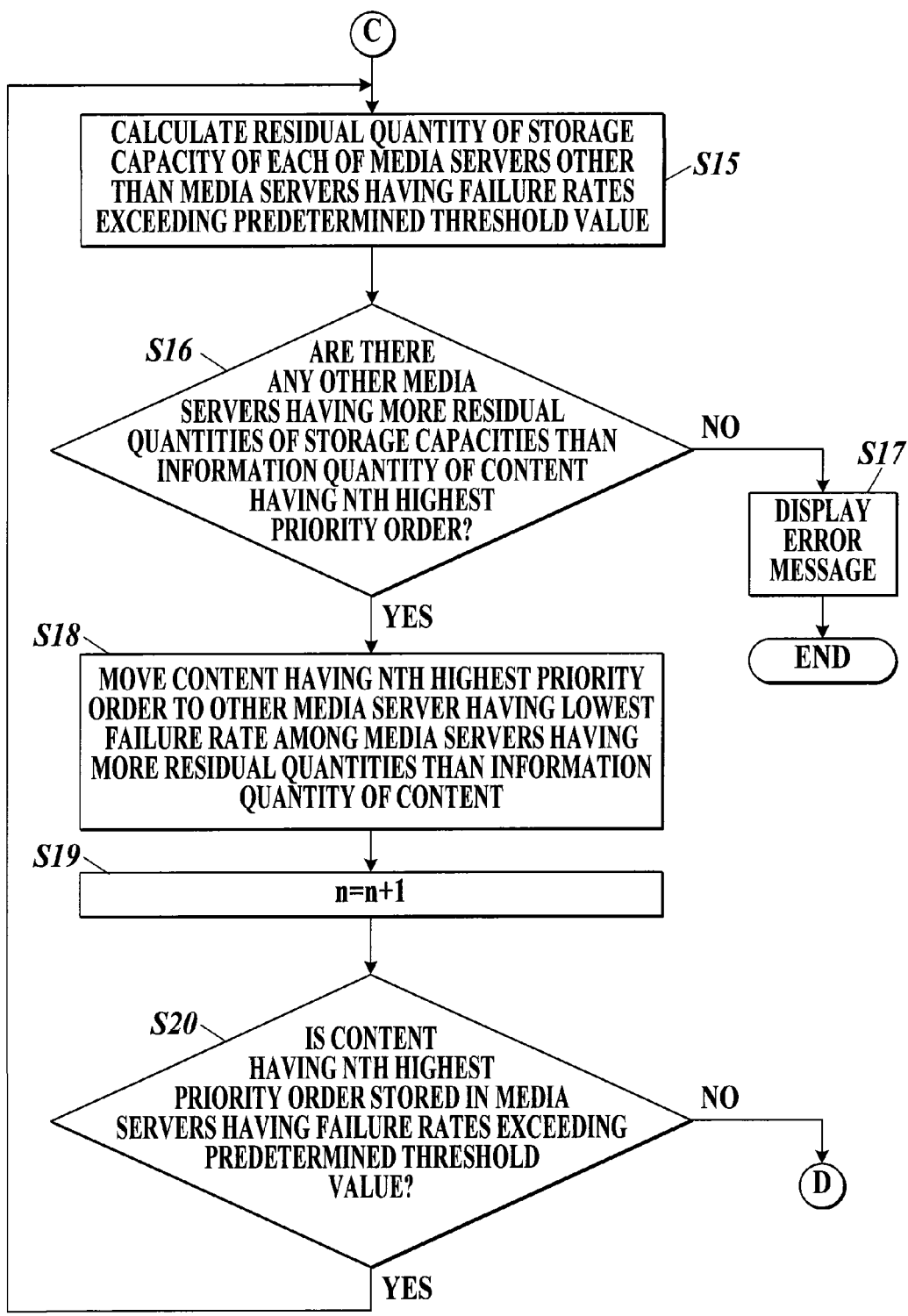
FIG. 5 is a flow chart for illustrating the processing pertaining to the movement of content by the content moving system of the first embodiment.

Next, the processing pertaining to the movement of content by the content moving system 1 is described with reference to the flow chart of FIGS. 5A and 5B.

The CPU 631 of the management server 6 first executes the failure rate calculating program 633a to calculate the failure rate of the hard disk 43 mounted in each of the plurality of media servers 4 (Step S11).

Next, the CPU 631 executes the judgment program 633b to judge whether there are media servers 4 having failure rates exceeding the predetermined threshold value or not among the plurality of media servers 4 (Step S12).

When the CPU 631 judges at the Step S12 that no media servers 4 having the failure rates exceeding the predetermined threshold value exist (Step S12; No), the CPU 631 repeats the processing at and after the Step S11.

On the other hand, when the CPU 631 judges at the Step S12 that the media servers 4 having the failure rates exceeding the predetermined threshold value exist (Step S12; Yes), the CPU 631 executes the setting program 633c to set a priority order to each piece of the content stored in the hard disk 43 of each of the media servers 4 judged to have the failure rates exceeding the predetermined threshold value (Step S13).

Next, the CPU 631 sets "1" at an "n" storage region in the RAM 632 (Step S14).

Next, the CPU 631 executes the residual quantity calculating program 633d to calculate the residual quantity of the storage capacity of the hard disk 43 mounted in each of the media servers 4 other than the media servers 4 judged to have the failure rates exceeding the predetermined threshold value (Step S15).

Next, the CPU 631 executes the movement controlling program 633e to judges whether the media servers 4 mounted with the hard disks 43 having the residual quantities of the storage capacities more than the information quantity of the content having the nth highest priority order exist or not on the basis of the residual quantities of the storage capacities calculated by the processing at the Step S15 (Step S16).

When the CPU 631 judges at the Step S16 that there are no other media servers 4 mounted with the hard disks 43 having the residual quantities of the storage capacities more than the information quantity of the content having the nth highest priority order (Step S16; No), the CPU 631 makes the image display sections 231 of the media players 2 display predetermined error messages in order to, for example, instruct the users to severally arrange the content stored in the hard disks 43 mounted in the plurality of media servers 4 (Step S17), and ends the present processing.

On the other hand, when the CPU 631 judges at the Step S16 that the other media servers 4 mounted with the hard disks 43 having the residual quantities of the storage capacities more than the information quantity of the content having the nth highest priority order exist (Step S16; Yes), the CPU 631 moves the content having the nth highest priority order to the other media server 4 mounted with the hard disk 43 having the lowest failure rate among those of the other media servers 4 mounted with the hard disks 43 having the residual quantities of the storage capacities more than the information quantity of the content (Step S18).

Next, the CPU 631 sets "n+1" in the "n" storage region in the RAM 632 (Step S19).

Next, the CPU 631 judges whether the content having the nth highest priority order is stored in the hard disks 43 of the media servers 4 judged to have the failure rates exceeding the predetermined threshold value or not (Step S20).

When the CPU 631 judges at the Step S20 that the content having the nth highest priority order is not stored in any of the hard disks 43 mounted in the media servers 4 judged to have the failure rates exceeding the predetermined threshold value (Step S20; No), the CPU 631 repeats the processing at and after the Step S11.

On the other hand, when the CPU 631 judges at the Step S20 that the content having the nth highest priority order is stored in one of the hard disks 43 mounted in the media servers 4 judged to have the failure rates exceeding the predetermined threshold value (Step S20; Yes), the CPU 631 repeats the processing at and after the Step S15.

According to the management server 6 and the content moving system 1 including the management server 6 of the first embodiment described above, the failure rate of the hard disk 43 mounted in each of the plurality of media servers 4 can be calculated by the CPU 631, which has executed the failure rate calculating program 633a, and it can be judged by the CPU 631, which has executed the judgment program 633b, whether the media servers 4 having the failure rates exceeding the predetermined threshold value, which failure rates have been calculated by the CPU 631, which has executed the failure rate calculating program 633a, exist or not among the plurality of media servers 4. When it is judged by the CPU 631, which has executed the judgment program 633b, that the media servers 4 having the failure rates exceeding the predetermined threshold value exist, the content stored in the media servers 4 can be moved to the other media servers 4 judged to have the failure rates less than the predetermined threshold value by the CPU 631, which has executed the judgment program 633b by the CPU 631, which has executed the movement controlling program 633e.

That is, when the failure rate of the hard disk 43 mounted in a certain media server 4 exceeds the predetermined threshold value, the content stored in the hard disk 43 mounted in the media server 4 can automatically be moved to the other media servers 4. Consequently, the risk of losing the content stored in the hard disk 43 mounted on the certain media server 4 owing to the failure of the hard disk 43 can suitably be reduced.

Moreover, the CPU 631, which has executed the movement controlling program 633e, can move the content stored in the media servers 4 judged to have the failure rates exceeding the predetermined threshold value by the CPU 631, which has executed the judgment program 633b, one by one in the order of the highest priority order set by the CPU 631, which has executed the setting program 633c, to the other media server 4 having the lowest failure rate among those calculated by the CPU 631, which has executed the failure rate calculating program 633a, among the media servers 4 having the residual quantities of the storage capacities more than the information quantity of the content, which residual quantities have been calculated by the CPU 631, which has executed the residual quantity calculating program 633d.

That is, the higher the priority order of content is, the lower the failure rate of the hard disk 43 mounted in the media server 4 to which the content is moved is. Consequently, the risk of losing the important content stored in the hard disks 43 mounted in the media servers 4 owing to the failures of the hard disks 43 can suitably be reduced.

Second Embodiment

Next, a management server 6A and a content moving system 1A including the management server 6A of a second embodiment is described.

Incidentally, the management server 6A and the content moving system 1A including the management server 6A of the second embodiment differ from the management server 6 and the content moving system 1 including the management server 6 of the first embodiment only in that the case of moving content after lowering the image quality of the content at the time of moving the content exists. To put it concretely, parts of the configurations of the control sections 44 of the media servers 4 (FIG. 3) and a part of the configuration of the control section 63 of the management server 6 (FIG. 4) differ from those of the second embodiment. Accordingly, only the different respects are described, and the other common parts are denoted by the same reference marks as those of the first embodiment to be described.

<Configuration of Content Moving System>

The configuration of the content moving system 1A is first described with reference to FIGS. 6-8.

Figure 6:
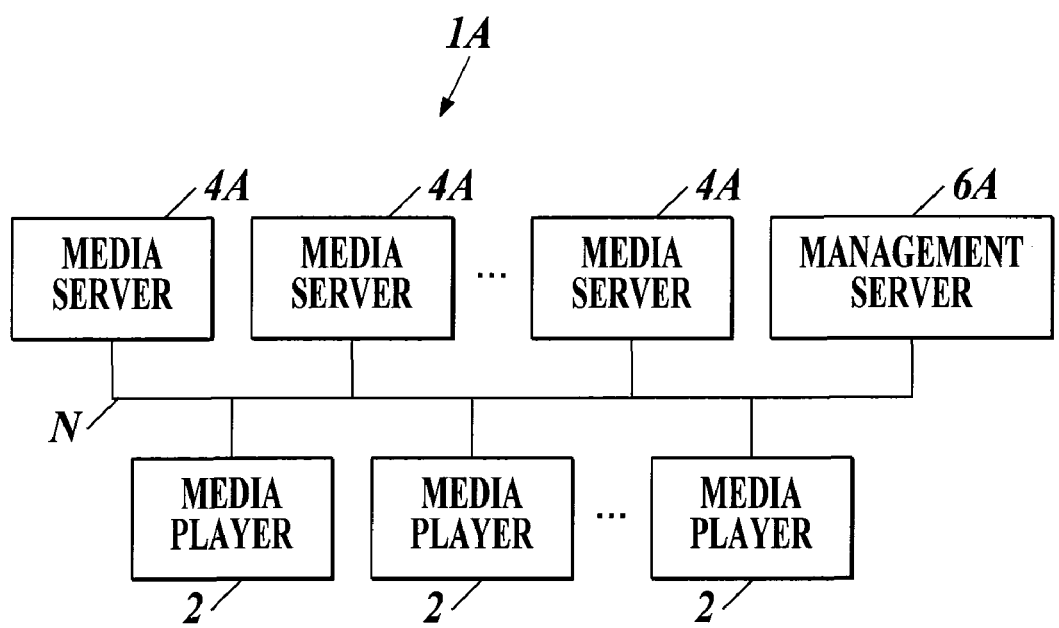
FIG. 6 is a diagram showing the configuration of the content moving system of a second embodiment.

The content moving system 1A includes, for example, as shown in FIG. 6, the plurality of media players 2, the plurality of media servers 4A to store the content received by the media players 2, and the management server 6A to manage the plurality of media servers 4A.

The plurality of media players 2, the plurality of media servers 4A, and the management server 6A are connected to one another through, for example, the network N.

<Configurations of Media Servers>

Figure 7:
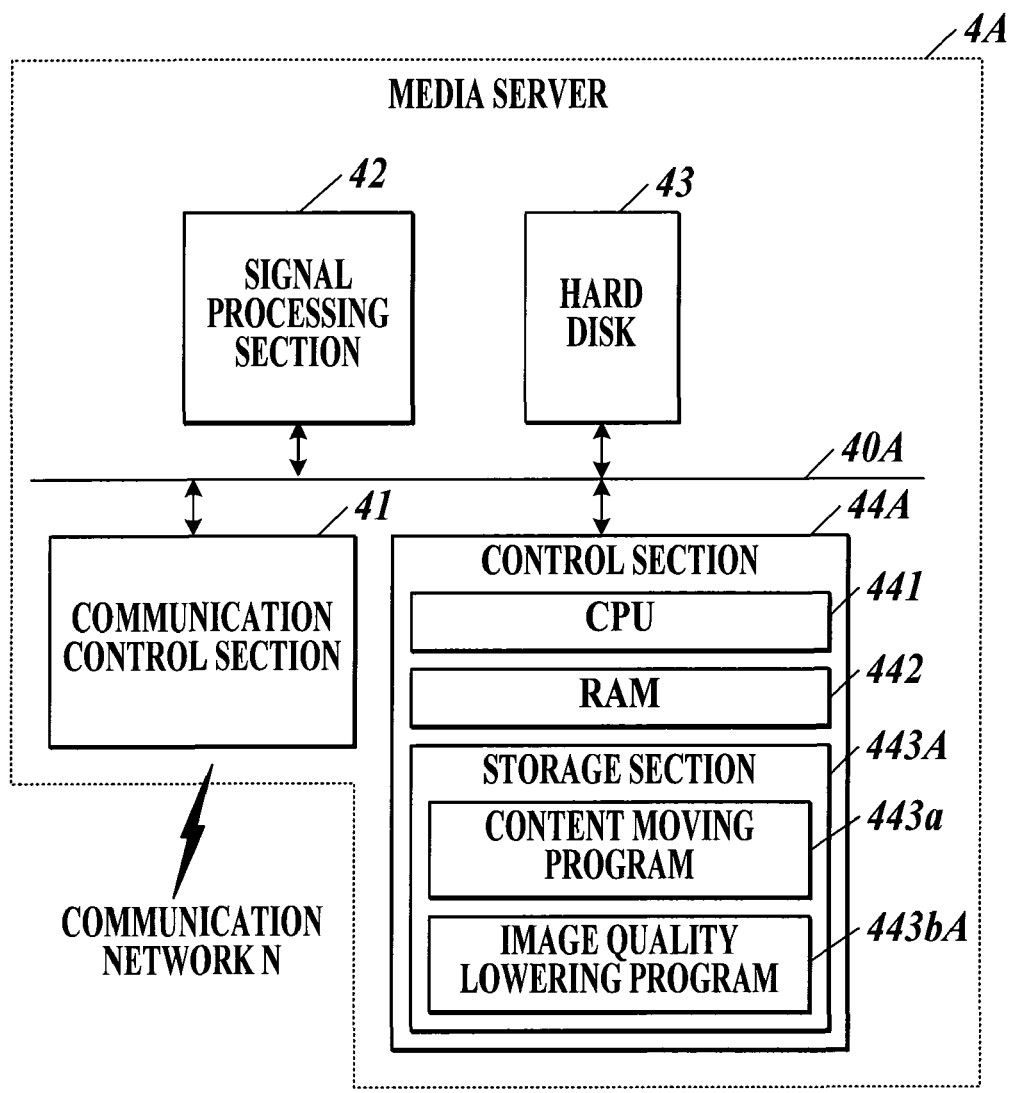
FIG. 7 is a block diagram showing the functional configuration of a media server of FIG. 6.

Each of the media servers 4A is, for example, a HDD recorder to store content, and includes, for example, as shown in FIG. 7, the communication control section 41, the signal processing section 42, the hard disk 43, a control section 44A, and the like. Each of the sections is connected to one another through a bus 40A.

The control section 44A includes, for example, as shown in FIG. 7, the CPU 441, the RAM 442, a storage section 443A, and the like.

The storage section 443A stores, for example, a system program to be able to be executed by the media server 4A, various processing programs to be able to be executed on the system program, the data to be used at the time of the execution of these various processing programs, the data of the processing results of arithmetic processing of the CPU 441, and the like. Incidentally, the programs are stored in the storage section 443A in the form of the program codes that can be read by a computer.

To put it concretely, the storage section 443A stores, for example, the content moving program 443a, an image quality lowering program 433bA, and the like.

The image quality lowering program 433bA enables the CPU 441 to realize the function of lowering the image quality of the content stored in the hard disk 43 in conformity with, for example, image quality lowering control information, which has been transmitted by the management server 6A and has been received by the communication control section 41.

To put it concretely, the CPU 441 produces, for example, the copy data of the content having the lowered image quality.

<Configuration of Management Server>

Figure 8:
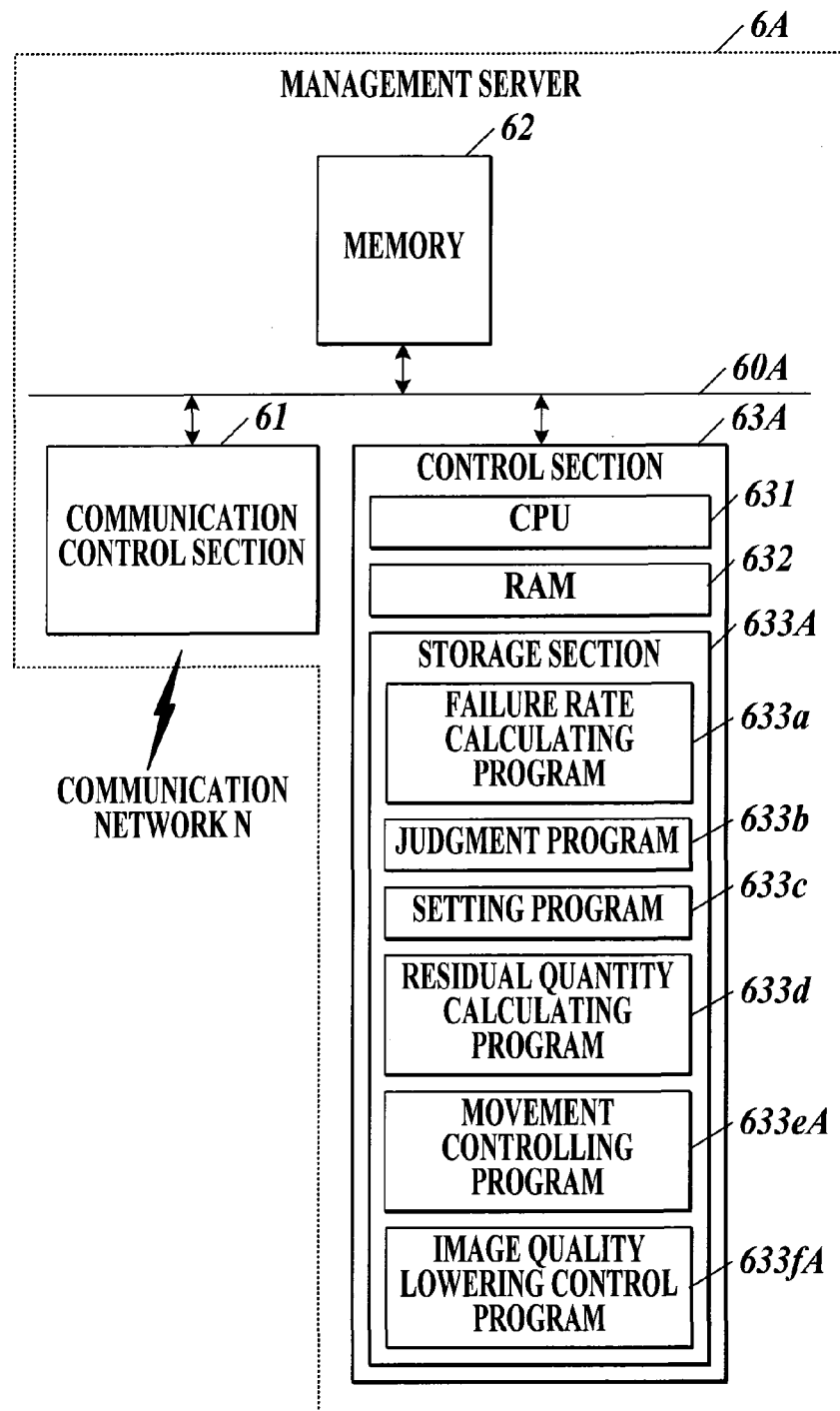
FIG. 8 is a block diagram showing the functional configuration of the management server of FIG. 6.

The management server 6A is a device to manage, for example, the hard disks 43 mounted in the media servers 4A, and includes, for example, as shown in FIG. 8, the communication control section 61, the memory 62, a control section 63A, and the like. Each of the sections is connected to one another through a bus 60A.

The control section 63A includes, for example, as shown in FIG. 8, the CPU 631, the RAM 632, a storage section 633A, and the like.

The storage section 633A stores, for example, a system program to be able to be executed by the management server 6A, various processing programs to be able to be executed on the system program, the data to be used at the time of the execution of the various processing programs, the data of the processing results of arithmetic processing of the CPU 631, and the like. Incidentally, the programs are stored in the storage section 633A in the form of the program codes that a computer can read.

To put it concretely, the storage section 633A stores, for example, the failure rate calculating program 633a, the judgment program 633b, the setting program 633c, the residual quantity calculating program 633d, a movement controlling program 633eA, an image quality lowering control program 633fA, and the like.

The movement controlling program 633eA, similarly to the movement controlling program 633e of the first embodiment, enables the CPU 631 to realize, for example, the function to move, according to priorities set by the CPU 631, which has executed the setting program 633c, the contents one by one, the contents being stored in the media server 4 judged to have the failure rate exceeding the predetermined threshold value by the CPU 631, which has executed the judgment program 633b, to a media server 4 calculated by the CPU 631, which has executed the failure rate calculating program 633a, to have a lowest failure rate among media servers 4 which are calculated by the CPU 631, which has executed the residual quantity calculating program 633d, to have residual quantities of storage capacities larger than an information quantity of a content which is to be moved next, and which are judged to have failure rates less than the predetermined threshold value by the CPU 631, which has executed the judgment program 633b.

Furthermore, the movement control program 633eA enables the CPU 631 to realize, for example, the function that when the content to be moved next cannot be moved to any of the media servers 4A judged to have failure rates less than the predetermined threshold value by the CPU 631, which has executed the judgment program 633b, because an information quantity of the content to be moved next is larger than the residual quantities of the media servers 4A judged to have failure rates less than the predetermined threshold value by the CPU 631, which has executed the judgment program 633b, the CPU 633, which has executed the movement controlling program 633eA, being to move copy data of the content to be moved next, the image quality of the copy data being lowered by the CPU 631, which has executed the image quality lowering control program 633fA, to the media server 4A calculated by the CPU 631, which has executed the failure rate calculating program 633a, to have a lowest failure rate among media servers 4A which are judged to have failure rates less than the predetermined threshold value by the CPU 631, which has executed the judgment program 633b, and to leave original data of the content to be moved next in the media server 4A which has stored the content.

The CPU 631 functions as a movement controlling section by executing such movement controlling program 633eA.

The image quality lowering control program 633fA enables the CPU 631 to realize, for example, the function of lowering the image quality of the content stored in the hard disks 43 mounted in the media servers 4A.

To put it concretely, the CPU 631, for example, makes the media servers 4A produce the copy data of the content having a lowered image quality.

To put it more concretely, the CPU 631 inputs, for example, a control signal to the communication control section 61 to make the communication control section 61 transmit to the media servers 4A judged to have the failure rates exceeding the predetermined threshold value an image quality lowering control information to instruct the lowering of the image quality of the content together with the content moving control information including the content identifying information to identify the content to be moved and the media server identifying information to identify the media server 4 of the move destination of the content, which content moving control information has been transmitted from the CPU 631, which has executed the movement controlling program 633eA.

The CPU 631 functions as an image quality lowering control section by executing such an image quality lowering control program 633fA.

<Content Moving Processing>

Figure 9B:
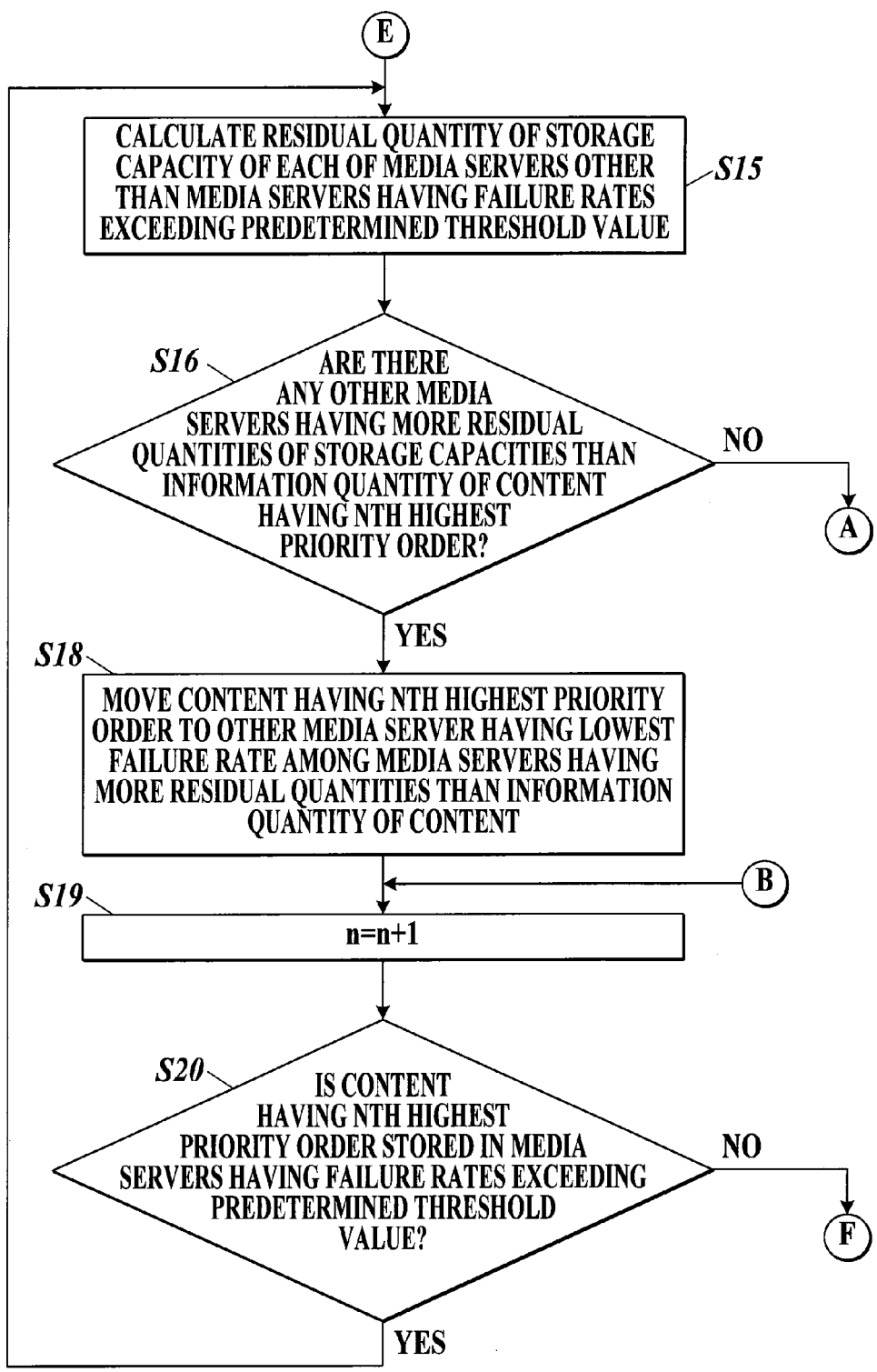
FIG. 9 is a flow chart for illustrating the first processing pertaining to the movement of content by the content moving system of the second embodiment.
Figure 10:
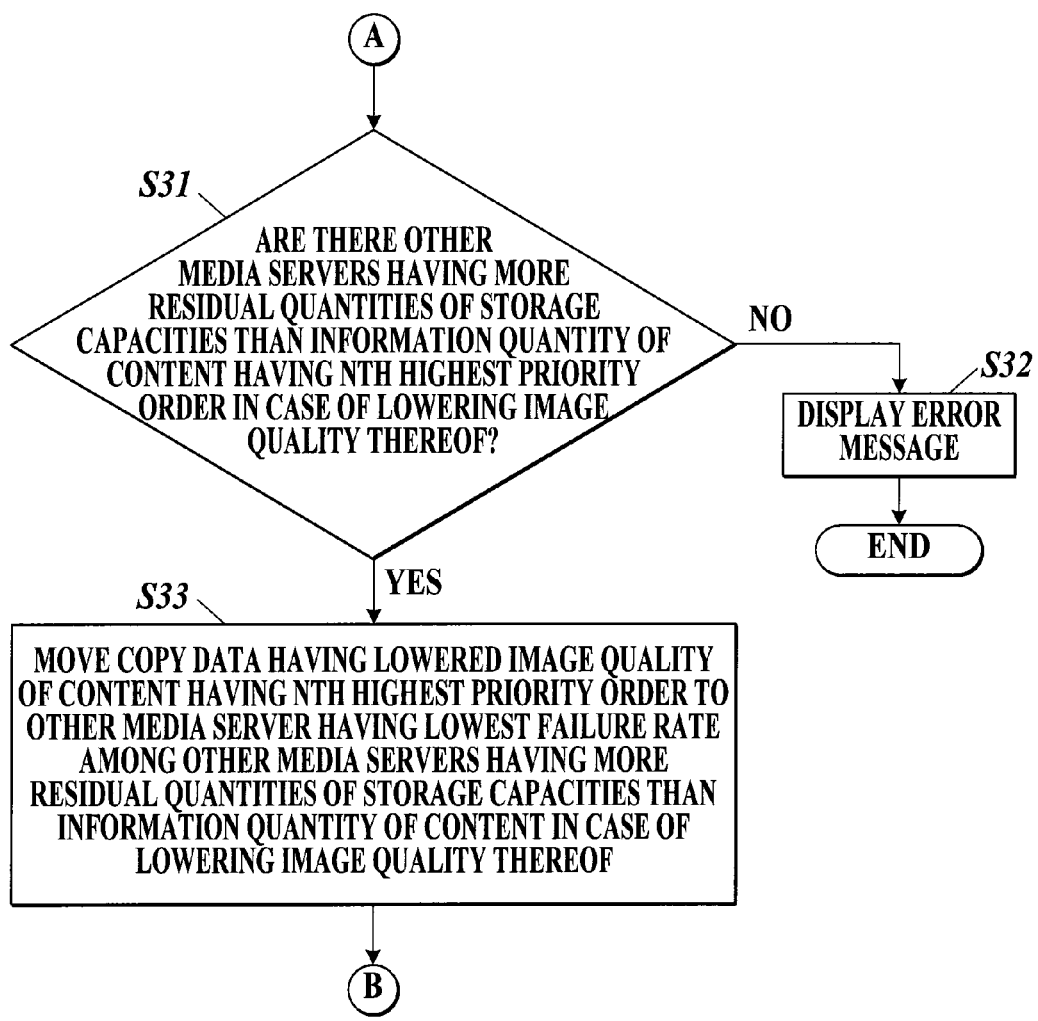
FIG. 10 is a flow chart for illustrating the second processing pertaining to the movement of content by the content moving system of the second embodiment.

Next, the processing pertaining to the movement of content by the content moving system 1A is described with reference to the flow charts of FIGS. 9A, 9B and 10.

Incidentally, the processing pertaining to the movement of the content by the content moving system 1A of the second embodiment differs from the processing pertaining to the movement of the content by the content moving system 1 of the first embodiment (FIGS. 5A and 5B) only in the processing in the case where the content to be moved cannot be moved to the other media servers 4A because the information quantity of the content is too large. To put it concretely, the processing of the second embodiment is different from the processing of the first embodiment at and after the Step S16 of FIG. 5B. Accordingly, only the different respect is described, and the other common parts are described by denoting the same reference marks as those of the first embodiment.

The CPU 631 of the management server 6A executes the movement controlling program 633eA to judge whether the other media servers 4A mounted with the hard disks 43 having the residual quantities of the storage capacities more than the information quantity of the content having the nth highest priority order exist or not on the basis of the residual quantities of the storage capacities calculated by the processing at the Step S15 (Step S16).

When the CPU 631 judges at the Step S16 that the other media servers 4A mounted with the hard disks 43 each having the residual quantity of the storage capacity more than the information quantity of the content having the nth highest priority order exist (Step S16; Yes), the CPU 631 moves the processing thereof to that at the Step S18.

On the other hand, when the CPU 631 judges at the Step S16 that there are no other media servers 4A mounted with the hard disks 43 each having the residual quantity of the storage capacity more than the information quantity of the content having the nth highest priority order (Step S16; No), the CPU 631 judges whether the other media servers 4A mounted with the hard disks 43 each having the residual quantity of the storage capacity more than the information quantity of the content having the nth highest priority order in the case where the image quality of the content is lowered exist or not on the basis of the residual quantities of the storage capacities calculated by the processing at the Step S15 (Step S31).

When the CPU 631 judges that there are no other media servers 4A mounted with the hard disks 43 each having the residual quantity of the storage capacity more than the information quantity of the content having the nth highest priority order in the case of lowering the image quality of the content at Step S31 (Step S31; No), the CPU 631 makes the image display sections 231 of the media players 2 display predetermined error messages, for example, in order to instruct users to arrange the content stored in the hard disk 43 mounted in the plurality of media servers 4A (Step S32), and ends the present processing.

On the other hand, when the CPU 631 judges at the Step S31 that the other media servers 4A mounted with the hard disks 43 each having the residual quantity of the storage capacity more than the information quantity of the content having the nth highest priority order in the case of lowering the image quality of the content exist (Step S31; Yes), the CPU 631 executes the movement controlling program 633eA and the image quality lowering control program 633fA to produces the copy data of the content having the nth highest priority order and having the lowered image quality. The CPU 631 then moves the copy data of the content the image quality of which has been lowered to the other media server 4A having the lowest failure rate among the other media servers 4A mounted with the hard disks 43 each having the residual quantity of the storage capacity more than the information quantity of the content having the nth highest priority order in the case where the image quality of the content is lowered, and leaves the original data of the content stored in the hard disk 43 mounted in the media server 4A storing the content in advance (Step S33). The CPU 631 then moves the processing thereof to that at the Step S19.

According to the management server 6A and the content moving system 1A including the management server 6A of the second embodiment described above, the movement controlling program 633eA can move the content the image quality of which has been lowered by the CPU 631, which has executed the image quality lowering control program 633fA, to the other media servers 4A in the case where the content to be moved cannot be moved to the other media servers 4A because the information quantity of the content is too large.

Consequently, although there are some cases where the image qualities are lowered, the content can be moved to the media servers 4A mounted with the hard disks 43 having low failure rates as much as possible. Thus, the risk of losing the content stored in the hard disks 43 mounted in the media servers 4A owing to the failures of the hard disks 43 can suitably be reduced.

Moreover, the movement controlling program 633eA can move the copy data of the content the image quality of which has been lowered by the CPU 631, which has executed the image quality lowering control program 633fA, to the other media server 4A, and can leave the original data of the content stored in the hard disk 43 of the media server 4A storing the content in advance.

Consequently, it is possible to store the content the image quality is kept in the hard disks 43, although the hard disks 43 have the high risks of failures.

Third Embodiment

Next, a management server 6B and a content moving system 1B including the management server 6B of a third embodiment are described.

Incidentally, the management server 6B and the content moving system 1B including the management server 6B of the third embodiment differ from the management server 6 and the content moving system 1 including the management server 6 of the first embodiment only in that not only the pieces of content stored in the hard disks 43 mounted in the media servers 4 judged to have the failure rates exceeding the predetermined threshold value are moved but all of the pieces of content stored in the hard disks 43 mounted in the plurality of media servers 4 included in the content moving system 1B are moved. To put it concretely, a part of the configuration of the control section 63 of the media server 6 (FIG. 4) differs from that of the third embodiment. Accordingly, only the different respects are described, and the other common parts are denoted by the same reference marks as those of the first embodiment to be described.

<Configuration of Content Moving System>

The configuration of the content moving system 1B is first described with reference to FIGS. 11 and 12.

Figure 11:
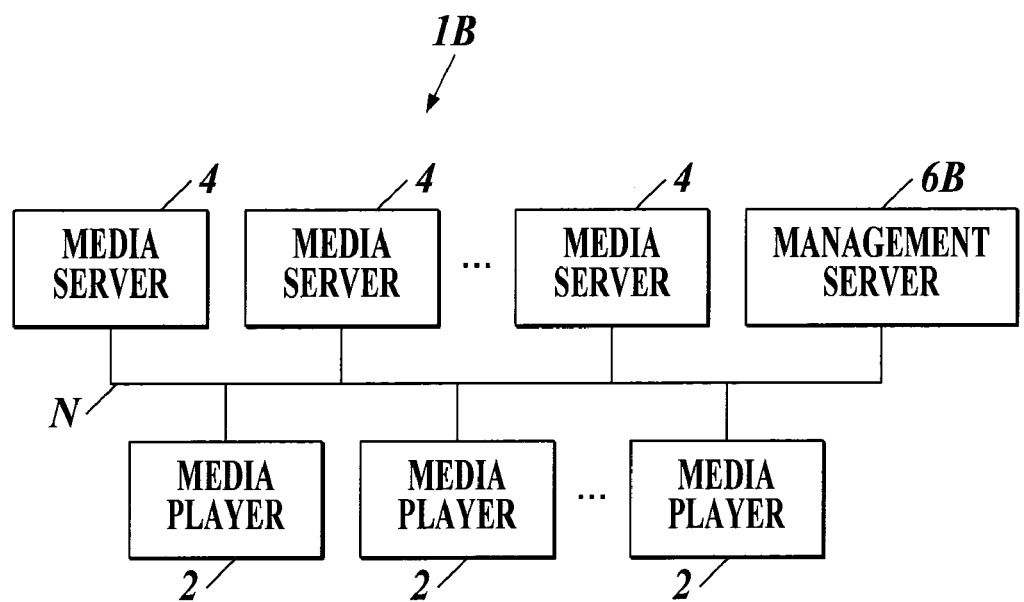
FIG. 11 is a diagram showing the configuration of the content moving system of a third embodiment.

The content moving system 1 includes, for example, as shown in FIG. 11, the plurality of media players 2, the plurality of media servers 4, and the management server 6B to manage the plurality of media servers 4.

The plurality of media players 2, the plurality of media servers 4, and the management server 6B are connected to one another through, for example, the network N.

<Configuration of Management Server>

Figure 12:
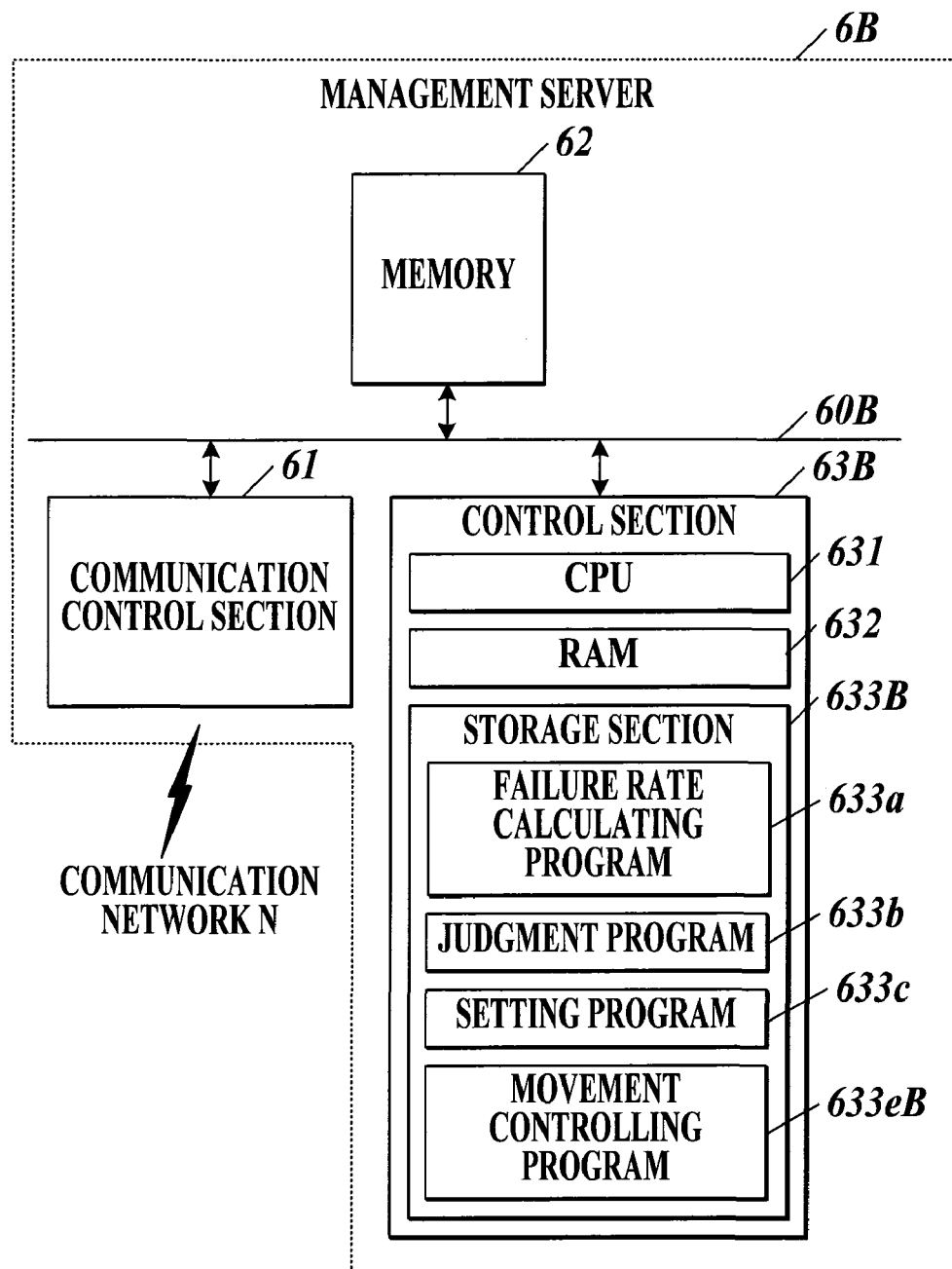
FIG. 12 is a block diagram showing the functional configuration of the management server of FIG. 11.

The management server 6B is a device to manage, for example, the hard disks 43 mounted in the media servers 4, and includes, for example, as shown in FIG. 12, the communication control section 61, the memory 62, a control section 63B, and the like. Each of the sections is connected to one another through a bus 60B.

The control section 63B includes, for example, as shown in FIG. 12, the CPU 631, the RAM 632, a storage section 633B, and the like.

The storage section 633B stores, for example, a system program to be able to be executed by the management server 6B, various processing programs to be able to be executed on the system program, the data to be used at the times of the execution of the various processing programs, the data of the processing results of arithmetic processing of the CPU 631, and the like. Incidentally, the programs are stored in the storage section 633B in the form of the program codes that can be read by a computer.

To put it concretely, the storage section 633B stores, for example, the failure rate calculating program 633a, the judgment program 633b, the setting program 633c, a movement controlling program 633eB, and the like.

The movement controlling program 633eB enables the CPU 631 to realize, for example, the function of moving, according to priorities set by the CPU 631 which has executed the setting program 633c, the contents one by one, the contents being stored in the media servers 4 judged to have the failure rate exceeding the predetermined threshold value by the CPU 631, which has executed the failure rate calculating program 633a, to a media server 4 calculated by the CPU 631, which has executed the failure rate calculating program 633a, to have a lowest failure rate.

To put it concretely, for example, when the CPU 631 judges that the media servers 4 having the failure rates exceeding the predetermined threshold value exist, the CPU 631 determines the media server 4 of the move destination of each piece of content stored in the hard disks 43 of the plurality of media servers 4 so that the higher the priority order of content is, the lower of the failure rate of the media server 4 to which the content is moved is, on the basis of the priority orders set by the CPU 631, which has executed the setting program 633*c*, the storage capacities of the hard disks 43 and the information quantity of the pieces of content that are stored in the memory 62, and the like. The CPU 631 then moves the content to the media servers 4 in conformity with the determination.

That is, for example, when three media servers 4 are included in the content moving system 1B, the CPU 631 determines the media server 4 of the move destination of each piece of content in such a way that the pieces of content is moved one by one in the order of the highs of the priority order to the media server 4 having the lowest failure rate, to the media server 4 having the second lowest failure rate when the residual quantity of the storage capacity of the media server 4 having the lowest failure rate becomes too small to store a piece of content, and to the media server 4 having the third lowest failure rate when the residual quantity of the storage capacity of the media server 4 having the second lowest failure rate becomes too small to store a piece of content. The CPU 631 then moves the pieces of content to the media servers 4 in conformity with the determination.

The CPU 631 functions as the movement controlling section by executing such movement controlling program 633*e*B.

<Content Moving Processing>

Figure 13:
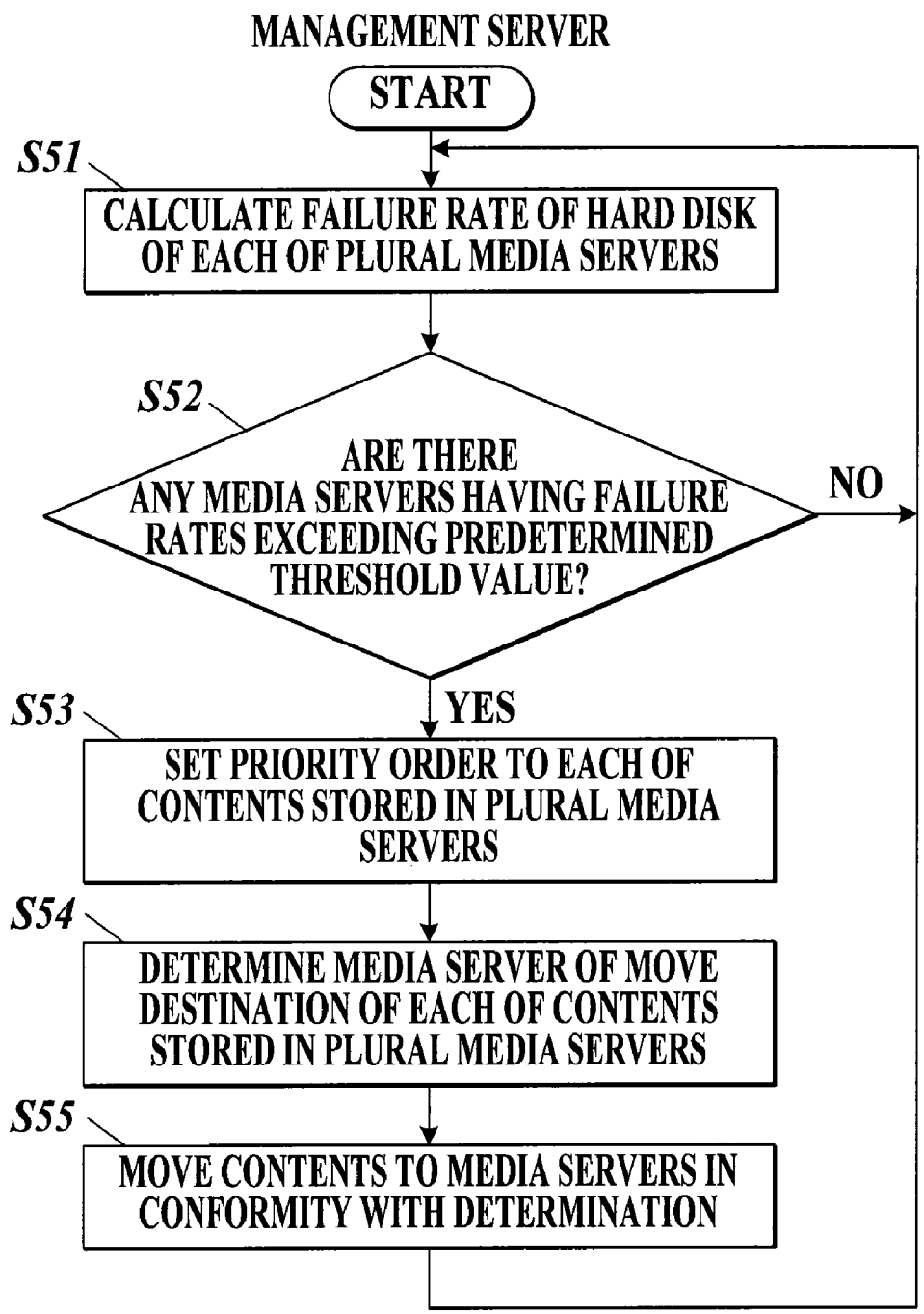
FIG. 13 is a flow chart for illustrating the processing pertaining to the movement of content by the content moving system of the third embodiment.

Next, the processing pertaining to the movement of content by the content moving system 1B is described with reference to the flow chart of FIG. 13.

The CPU 631 of the management server 6B first executes the failure rate calculating program 633*a* to calculate the failure rate of the hard disk 43 mounted in each of the plurality of media servers 4 (Step S51).

Next, the CPU 631 executes the judgment program 633*b* to judge whether the media servers 4 having the failure rates exceeding the predetermined threshold value exist or not among the plurality of media servers 4 (Step S52).

When the CPU 631 judges at the Step S52 that there are no media servers 4 having the failure rates exceeding the predetermined threshold value (Step S52; No), the CPU 631 repeats the processing at and after the Step S51.

On the other hand, when the CPU 631 judges at the Step S52 that there are media servers 4 having the failure rates exceeding the predetermined threshold value (Step S52; Yes), the CPU 631 executes the setting program 633*c* to set a priority order to each piece of content stored in the hard disks 43 of the plurality of media servers 4 (Step S53).

Next, the CPU 631 executes the movement controlling program 633*e*B to determine the media server 4 of the move destination to each piece of content stored in the hard disks of the plurality of media servers 4 (Step S54), and the CPU 631 moves the content to the media servers 4 in conformity with the determination (Step S55). The CPU 631 then repeats the processing at and after the Step S51.

According to the management server 6B and the content moving system 1B including the management server 6B of the third embodiment described above, when it is judged that the media servers 4 having the failure rates exceeding the predetermined threshold value exist by the CPU 631, which has executed the judgment program 633*b*, the content stored in the plurality of media servers 4 can be moved by the CPU 631, which has executed the movement controlling program 633*e*B, to the media servers 4 having the lowest failure rates calculated by the CPU 631, which has executed the failure rate calculating program 633*a*, one by one in the order of the heights of the priority orders set by the CPU 631, which has executed the setting program 633*c*.

That is, when the failure rate of the hard disk 43 mounted in a certain media server 4 exceeds the predetermined threshold value, the pieces of content stored in the hard disks 43 mounted in the plurality of media servers 4 can automatically be moved to the media servers 4 mounted with the hard disks 43 having lower failure rates one by one in the order of the heights of the priority orders. Consequently, the risk of losing the pieces of content having higher priority orders stored in the hard disk 43 mounted in the certain media server 4 can suitably be reduced.

Incidentally, the present invention is not limited to the embodiments described above, but the embodiments can suitably be changed without departing from the spirit and the scope of the invention.

In the second embodiment, when the content to be moved cannot be moved to the other media server 4A because the content has too large information quantity, the second embodiment stores the copy data of the content the image quality of which has been lowered to the other media server 4A, and leaves the original data of the content stored in the hard disk 43 of the media server 4A storing the content in advance. However, only the thing required for the embodiment is to be able to move at least the pieces of content having the lowered image qualities to the other media servers 4A, and the original data of the pieces of content may not be left to be stored in the hard disks 43 of the media servers 4A storing the contents in advance.

In the third embodiment, when the pieces of content to be moved cannot be moved to the other media servers 4 because the information quantities of the pieces of content are too large, the pieces of content the image qualities of which have been lowered may be moved to the other media servers 4.

In the first to the third embodiments, when pieces of content are moved, for example, the movements may be informed to users through the image display sections 231 of the media players 2.

Moreover, in the first to the third embodiments, when it is judged that the media servers 4 mounted with the hard disks 43 each having the failure rate exceeding the predetermined threshold value exist, for example, instructions for users to change the hard disks 43 mounted in the media servers 4 may be issued through the image display sections 231 of the media players 2.

In the first to the third embodiments, a failure rate is calculated on the basis of the sum of the operating times of each of the hard disks 43 and the MTBF of the hard disk 43, but the failure rate may be calculated on the basis of the information obtained by, for example, a self-diagnosis function (for example, self-monitoring, analysis and reporting technology (SMART) function), which is a general function added to each of the hard disks 43 in advance and can monitor access errors and the information of the inside of the disk such as temperature information.

In the first to the third embodiments, the priority order according to the order of recorded dates is set to pieces of content, but the priority order may be arbitrarily determined on the basis of, for example, the order of recording times, the order of the numbers of viewing, the order of image qualities, the order of genres, and the like.

The priority order according to the recording times is here, for example, the order set in such a way that the longer the recording time of a piece of content is, the higher the priority order to be given to the content is.

Moreover, the priority order according to the numbers of viewing is, for example, the order set in such a way that the content having the number of viewing of 0 is given the first priority order, and that the larger the numbers of viewing the content are, the higher the priority orders given to the content are, as for the priority orders on and after the second highest priority order.

Moreover, the priority order according to the order of the image qualities is, for example, the order set in such a way that the higher the image quality of a piece of content is, the higher the priority order given to the content is.

Moreover, the priority order according to the order of the genres is, for example, the order set in such a way that the more the number of a genre stored in the memory 62 is, the higher the priority order given to the genre is. Incidentally, the priority orders according to the genre orders are not limited to the determination based on the genres of the presently stored content, but only the thing required for the priority orders is to be the order set in such a way that the nearer a piece of content is to the genre matched to the user's hobbies and diversions, the higher the priority order given to the genre of the content is. For example, the priority order may be registered by a user in advance or may be determined on the basis of the genres of all the pieces of content that have been stored before now.

In the first to the third embodiments, the priority order of content is determined at the time of the processing pertaining to the movement of the content by the content moving systems 1, 1A, and 1B, but the priority order of the content may be determined before the processing.

According to a first aspect of the preferred embodiments of the present invention, there is provided a content moving system, comprising a plurality of media servers each to store contents, and a management server to manage the plurality of media servers, wherein the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize the contents stored in the media server calculated to have the failure rate exceeding the predetermined threshold value; a residual quantity calculating section to calculate a residual quantity of a storage capacity of each of the plurality of media servers; and a movement controlling section to move, according to priorities set by the setting section, the contents one by one, the contents being stored in the media server judged to have the failure rate exceeding the predetermined threshold value by the judgment section, to a media server calculated by the failure rate calculating section to have a lowest failure rate among media servers which are calculated by the residual quantity calculating section to have residual quantities of storage capacities larger than an information quantity of a content which is to be moved next, and which are judged to have failure rates less than the predetermined threshold value by the judgment section, and the plurality of media servers respectively include storage sections to store the contents.

According to a first aspect of the present invention, the failure rate of each of a plurality of media servers can be calculated by a failure rate calculating section; it can be judged by a judgment section whether or not there is a media server having a failure rate which has been calculated by the failure rate calculating section and which exceeds a predetermined threshold value, among the plurality of media servers; and the content stored in the media server judged to have the failure rate exceeding the predetermined threshold value by the judgment section can be moved by a movement controlling section to a media server calculated by the failure rate calculating section to have a lowest failure rate among media servers which are calculated by the residual quantity calculating section to have residual quantities of storage capacities larger than an information quantity of a content which is to be moved next, and which are judged to have failure rates less than the predetermined threshold value by the judgment section.

That is, when the failure rate of the hard disk mounted in a certain media server exceeds the predetermined threshold value, the content stored in the hard disk mounted in the certain media server can automatically be moved to another media server. Consequently, the risk of losing the content stored in the hard disk mounted on the certain media server owing to the failure of the hard disk can suitably be reduced.

Moreover, the movement controlling section can move the content stored in the media servers judged to have the failure rates each exceeding the predetermined threshold value by the judgment section to the other media server having the lowest failure rate among those, calculated by the failure rate calculating section, of the other media servers having the residual quantities of the storage capacities calculated by the residual quantity calculating section, the residual quantities being larger than the information quantities of the contents, which are moved one by one according to priorities set by the setting section.

That is, the higher the priority order of the contents is, the lower the failure rate of the hard disk mounted in a media server to which the content is moved is. Consequently, the risk of losing the important content stored in the hard disks mounted on the media servers owing to the failures of the hard disks can suitably be reduced.

According to a second aspect of the preferred embodiments of the present invention, there is provided a content moving system, comprising a plurality of media servers each to store contents, and a management server to manage the plurality of media servers, wherein the plurality of media servers respectively include storage sections to store the contents, and the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize the contents stored in the media server calculated to have the failure rate exceeding the predetermined threshold value; a residual quantity calculating section to calculate a residual quantity of a storage capacity of each of the plurality of media servers; an image quality lowering control section to lower image qualities of the contents respectively stored in the media servers, and a movement controlling section to move, according to priorities set by the setting section, the contents one by one, the contents being stored in the media server judged to have the failure rate exceeding the predetermined threshold value by the judgment section to a media server calculated by the failure rate calculating section to have a lowest failure rate among media servers which are calculated by the residual quantity calculating section to have residual quantities of storage capacities larger than an information quantity of a content which is to be moved next, and which are judged to have failure rates less than the predetermined threshold value by the judgment section, and when the content to be moved next cannot be moved to any of the media servers judged to have failure rates less than the predetermined threshold value by the judgment section, because an information quantity of the content to be moved next is larger than the residual quantities of the media servers judged to have failure rates less than the predetermined threshold value by the judgment section, the movement controlling section being to move copy data of the content to be moved next, the image quality of the copy data being lowered by the image quality lowering control section, to the media server calculated by the failure rate calculating section to have a lowest failure rate among media servers which are judged to have failure rates less than the predetermined threshold value by the judgment section, and to leave original data of the content to be moved next in the media server which has stored the content.

According to a second aspect of the present invention, the failure rate of each of a plurality of media servers can be calculated by a failure rate calculating section; it can be judged by a judgment section whether or not there is a media server having the failure rate which has been calculated by the failure rate calculating section and which exceeds a predetermined threshold value, among the plurality of media servers; and the content stored in the media server judged to have the failure rate exceeding the predetermined threshold value by the judgment section can be moved by a movement controlling section to another media server judged to have the failure rate less than the predetermined threshold value by the judgment section.

That is, when the failure rate of the hard disk mounted in a certain media server exceeds the predetermined threshold value, the content stored in the hard disk mounted in the certain media server can automatically be moved to another media server. Consequently, the risk of losing the content stored in the hard disk mounted in the certain media server owing to the failure of the hard disk can suitably be reduced.

Moreover, the movement controlling section can move the contents stored in the media servers judged to have the failure rates each exceeding the predetermined threshold value by the judgment section to the other media server having the lowest failure rate among those, calculated by the failure rate calculating section, of the other media servers having the residual quantities of the storage capacities calculated by the residual quantity calculating section, the residual quantities being larger than the information quantities of the contents, which are moved one by one according to priorities set by the setting section.

That is, the higher the priority order of the contents is, the lower the failure rate of the hard disk mounted on a media server to which the content is moved is. Consequently, the risk of losing the important content stored in the hard disks mounted in the media servers owing to the failures of the hard disks can suitably be reduced.

Moreover, when the content to be moved next cannot be moved to any of the media servers judged to have failure rates less than the predetermined threshold value by the judgment section, because an information quantity of the content to be moved next is larger than the residual quantities of the media servers judged to have failure rates less than the predetermined threshold value by the judgment section, the movement controlling section can move the content having the image quality lowered by the image quality lowering control section to a media server calculated by the failure rate calculating section to have a lowest failure rate among media servers which are judged to have failure rates less than the predetermined threshold value by the judgment section.

Consequently, although there are some cases where the image quality is lowered, the contents can be moved to the media servers mounted with the hard disks having lower failure rates as many as possible. Consequently, the risk of losing the content stored in the hard disks mounted in the media servers owing to the failures of the hard disks can suitably be reduced.

Moreover, the movement controlling section can move the copy data of the content having the image quality lowered by the image quality lowering control section to the other media servers, and can leave the original data of the content stored in the media servers storing the content in advance.

Consequently, although the hard disks are the ones having the risks of causing failures, the content keeping the image quality can be stored.

According to a third aspect of the preferred embodiments of the present invention, there is provided a management server to manage a plurality of media servers each to store contents, the management server comprising: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; and a movement controlling section to move the contents stored in the media server judged to have the failure rate exceeding the predetermined threshold value by the judgment section to a media server judged to have a failure rate less than the predetermined threshold value by the judgment section.

According to a third aspect of the present invention, the failure rate of each of a plurality of media servers can be calculated by a failure rate calculating section; it can be judged by a judgment section whether or not there is a media server having a failure which has been calculated by the failure rate calculating section and which exceeds a predetermined threshold value, among the plurality of media servers; and the contents stored in the media server judged to have the failure rate exceeding the predetermined threshold value by the judgment section can be moved by a movement controlling section to a media server judged to have a failure rate less than the predetermined threshold value by the judgment section.

That is, when the failure rate of the hard disk mounted in a certain media server exceeds the predetermined threshold value, the contents stored in the hard disk mounted in the certain media server can automatically be moved to a media server judged to have a failure rate less than the predetermined threshold value by the judgment section. Consequently, the risk of losing the contents stored in the hard disk mounted in the certain media server owing to the failure of the hard disk can suitably be reduced.

According to a fourth aspect of the preferred embodiments of the present invention, there is provided a content moving system, comprising a plurality of media servers each to store contents, and a management server to manage the plurality of media servers, wherein the management server includes: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize all of the contents stored in media servers calculated to have the failure rate exceeding the predetermined threshold value; and a movement controlling section to move, according to priorities set by the setting section, the contents one by one, the contents being stored in the media servers judged to have the failure rate exceeding the predetermined threshold value by the judgment section, to a media server calculated by a failure rate calculating section to have a lowest failure rate, and the plurality of media servers respectively include storage sections to store the contents.

According to a fourth aspect of the present invention, the failure rate of each of the plurality of media servers can be calculated by a failure rate calculating section; it can be judged by a judgment section whether or not there is a media server having a failure rate which has been calculated by the failure rate calculating section and which exceeds a predetermined threshold value, among the plurality of media servers; a priority order can be set to all of the contents stored in media servers calculated to have the failure rate exceeding the predetermined threshold value by a setting section; and the contents stored in the media server judged to have the failure rate exceeding the predetermined threshold value by the judgment section among the plurality of media servers can be moved by a movement controlling section to a media server calculated by a failure rate calculating section to have a lowest failure rate, the contents moved one by one in the order of heights of the priority orders set by the setting section.

That is, when the failure rate of the hard disk mounted on a certain media server exceeds the predetermined threshold value, the contents stored in the hard disks mounted in media servers can automatically be moved to the media servers mounted with hard disks having lower failure rates one by one in the order of the heights of the priority order. Consequently, the risk of losing the pieces of content having high priority orders among the pieces of content stored in the hard disk mounted in the certain media server owing to the failure of the hard disk can suitably be reduced.

According to a fifth aspect of the preferred embodiments of the present invention, there is provided a management server to manage a plurality of media servers each to store contents, the server comprising: a failure rate calculating section to calculate a failure rate of each of the plurality of media servers; a judgment section to judge whether or not there is a media server having a failure rate which has been calculated by the failure rate calculating section and which exceeds a predetermined threshold value, among the plurality of media servers; a setting section to prioritize all of the contents stored in media servers calculated to have the failure rate exceeding the predetermined threshold value; and a movement controlling section to move, according to priorities set by the setting section, the contents one by one, the contents being stored in the media servers judged to have the failure rate exceeding the predetermined threshold value by the judgment section, to a media server calculated by a failure rate calculating section to have a lowest failure rate.

According to a fifth aspect of the present invention, the failure rate of each of the plurality of media servers can be calculated by a failure rate calculating section; it can be judged by a judgment section whether or not there is a media server having a failure rate which has been calculated by the failure rate calculating section and which exceeds a predetermined threshold value, among the plurality of media servers; a priority order can be set to all of the contents stored in media servers calculated to have the failure rate exceeding the predetermined threshold value by a setting section; and the contents stored in the media server judged to have the failure rate exceeding the predetermined threshold value by the judgment section among the plurality of media servers can be moved by a movement controlling section to a media server calculated by a failure rate calculating section to have a lowest failure rate, the contents moved one by one in the order of heights of the priority orders set by the setting section.

That is, when the failure rate of the hard disk mounted on a certain media server exceeds the predetermined threshold value, the contents stored in the hard disks mounted in media servers can automatically be moved to the media servers mounted with hard disks having lower failure rates one by one in the order of the heights of the priority order. Consequently, the risk of losing the pieces of content having high priority orders among the pieces of content stored in the hard disk mounted in the certain media server owing to the failure of the hard disk can suitably be reduced.

The entire disclosure of Japanese Patent Application No. 2006-312655 filed on Nov. 20, 2006, including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A content moving system, comprising a plurality of media servers each to store pieces of content, and a management server to manage the plurality of media servers, wherein the management server includes:
   a failure rate calculating section to calculate a failure rate of hard disk of each of the plurality of media servers;
   a judgment section to judge whether or not there is a media server having a failure rate which has been calculated by the failure rate calculating section and which exceeds a predetermined threshold value, among the plurality of media servers;
   a setting section to prioritize the pieces of content stored in each of the plurality of media servers;
   a residual quantity calculating section to calculate a residual quantity of a storage capacity of each of the plurality of media servers; and
   a movement controlling section to determine a destination media server for each piece of the content stored in each of the plurality of media servers when the judgment section judges that there is a media server having the failure rate exceeding the predetermined threshold value, the destination media server being determined so that the higher a priority order of a piece of content is, the lower the failure rate of a media server to which a piece of content is moved is, based on the priority order of a piece of content set by the setting section, the residual quantity of the storage capacity of each of the plurality of media servers calculated by the residual quantity calculating section, and an information quantity of a piece of content stored in each of the plurality of media servers, the movement controlling section moving a piece of content to any of the media servers based on the determination of the destination media server; and
   the plurality of media servers respectively include storage sections to store the pieces of content.

2. A management server to manage a plurality of media servers each to store pieces of content, the management server comprising:
   a failure rate calculating section to calculate a failure rate of hard disk of each of the plurality of media servers;
   a judgment section to judge whether or not there is a media server having a failure rate which has been calculated by the failure rate calculating section and which exceeds a predetermined threshold value, among the plurality of media servers;
   a setting section to prioritize the pieces of content stored in each of the plurality of media servers;
   a residual quantity calculating section to calculate a residual quantity of a storage capacity of each of the plurality of media servers; and
   a movement controlling section to determine a destination media server for each piece of the content stored in each of the plurality of media servers when the judgment section judges that there is a media server having the failure rate exceeding the predetermined threshold value, the destination media server being determined so that the higher a priority order of a piece of content is, the lower the failure rate of a media server to which a piece of content is moved is, based on the priority order of a piece of content set by the setting section, the residual quantity of the storage capacity of each of the plurality of media servers calculated by the residual quantity calculating section, and an information quantity of a piece of content stored in each of the plurality of media servers, the movement controlling section moving a piece of content to any of the media servers based on the determination of the destination media server.

* * * * *